United States Patent [19]

Nagase et al.

[11] Patent Number: 5,313,233
[45] Date of Patent: May 17, 1994

[54] IMAGE FORMING APPARATUS

[75] Inventors: Yukio Nagase, Kawasaki; Yuji Sakemi; Akira Watanabe, both of Yokohama; Masahiro Itoh, Sagamihara; Kenichi Takeda, Yokohama; Kazuhisa Kemmochi, Machida, all of Japan

[73] Assignee: Canon Kabushiki Kaisha, Tokyo, Japan

[21] Appl. No.: 58,661

[22] Filed: May 10, 1993

Related U.S. Application Data

[63] Continuation of Ser. No. 938,531, Sep. 2, 1992, abandoned, which is a continuation of Ser. No. 530,175, May 29, 1990, abandoned.

[30] Foreign Application Priority Data

May 30, 1989 [JP] Japan .................... 1-136375
May 31, 1989 [JP] Japan .................... 1-138781

[51] Int. Cl.$^5$ ............................. H04N 1/21
[52] U.S. Cl. ..................... 346/108; 355/211
[58] Field of Search ............. 346/1.1, 107 R, 76 L, 346/108, 160; 358/296, 298, 300, 302; 355/200, 202, 211

[56] References Cited

U.S. PATENT DOCUMENTS

| 4,742,363 | 5/1988 | Shiraishi | 346/108 |
| 4,748,474 | 5/1988 | Kurematsu et al. | . |
| 4,768,043 | 8/1988 | Saito et al. | 346/108 |
| 4,775,896 | 10/1988 | Umeda et al. | 358/298 |
| 4,839,692 | 6/1989 | Shoji et al. | 355/211 |
| 5,177,536 | 1/1993 | Watanabe et al. | . |

FOREIGN PATENT DOCUMENTS

| 0216462 | 4/1987 | European Pat. Off. | H04N 1/40 |
| 0227006 | 7/1987 | European Pat. Off. | G03G 9/10 |
| 0276112 | 7/1988 | European Pat. Off. | G03G 15/01 |
| 0332428 | 9/1989 | European Pat. Off. | H04N 1/40 |
| 3618032 | 1/1987 | Fed. Rep. of Germany | B41J 3/21 |
| 2084423 | 4/1982 | United Kingdom | G02B 27/17 |

Primary Examiner—Mark J. Reinhart
Attorney, Agent, or Firm—Fitzpatrick, Cella, Harper & Scinto

[57] ABSTRACT

An image forming apparatus wherein a laser beam produced by a laser source is imaged through an imaging optical system on an image bearing member as a beam spot. The beam spot scans the image bearing member in a main scan direction. The laser source is rendered on and off to form an image with picture elements. The laser driving pulse width per picture element is changed in accordance with the image density of the image to be formed, so that the tone gradation of the image is provided on the image bearing member in accordance with the pulse width. The size of the spot measured in the main scan direction ($1/e^2$ diameter) is not more than 0.7 times of the size of the picture element measured in the main scan direction.

19 Claims, 12 Drawing Sheets

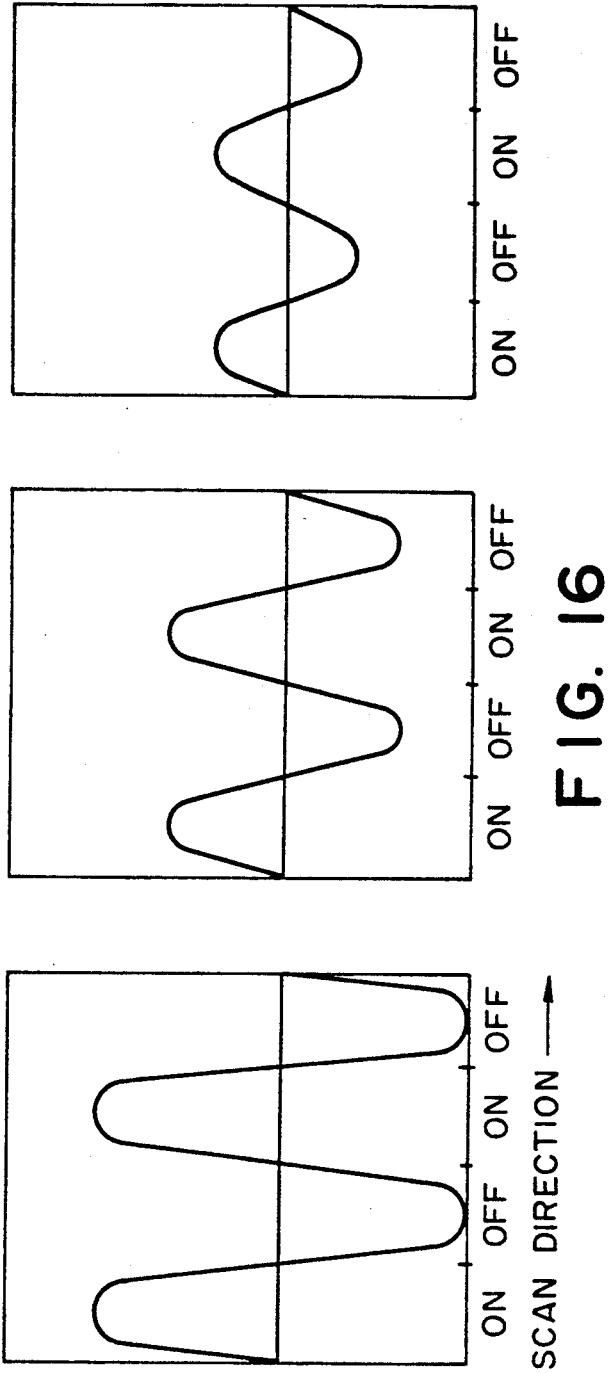

IMAGE FORMING APPARATUS

This application is a continuation of application Ser. No. 07/938,531 filed Sep. 2, 1992, abandoned, which is a continuation of application Ser. No. 07/530,175 filed May 29, 1990, abandoned.

FIELD OF THE INVENTION AND RELATED ART

The present invention relates to an image forming apparatus wherein an electrophotographic photosensitive member is scanned by a light beam modulated in accordance with signals indicative of the image to be recorded to form a latent image thereon, and the latent image is developed.

One of such image forming apparatuses is a laser beam printer of an electrophotographic type which is advantageous in the high speed recording and having low noise. In this printer, so-called binary level recording wherein the laser beam is either energized or deenergized in accordance with the image signal. In order to record a halftone image in the laser beam printer of the binary level recording, a dither method, density pattern method or the like are known. As is known, however, the dither method and the density pattern method are not suitable to provide a high resolution image. Recently, a proposal has been made as to the system for recording a halftone image without reducing the recorded density and the resolution. In this system, the halftone image is recorded by modulating a width of a pulse signal for driving the laser in accordance with the image signal. More particularly, the on-period of the beam per one picture element of the laser is controlled in accordance with the density of the image to be recorded. In other words, the exposure period of the photosensitive member per one picture element (pixel) by the laser beam scanning the photosensitive member is controlled in accordance with the density of the image. More particularly, the pulse width is short for the low density portion of the image to provide the long exposure period, whereas the pulse width is long for the high density image portion to provide the longer exposure period. In accordance with the pulse width modulation system (PWM system), the image can be formed with high resolution and high tone gradation, and is particularly suitable for a color image forming apparatus which requires the high resolution and the high tone gradation.

In the PWM system, the area tone gradation is possible for the dot formed by the beam spot per one pixel, and therefore, the halftone gradation is represented without decreasing the density of the pixels (recording density).

However, it has been found that the exposure distribution on the scanned surface (surface of the photosensitive member) is influenced by the spot diameter of the laser beam, as shown in FIGS. 5A and 5B. In these Figures, the exposure distributions on the scanned surface are shown under the following conditions:

Density of pixels: 400 dpi (unit pixel size is 63.5 microns)

Laser spot diameter: 70 microns (the diameter at $1/e^2$ in the main scan Gauss distribution)

Laser on-period: the duration corresponding to $\frac{1}{4}$ pixel (25%)/unit pixel, and the duration corresponding to $\frac{1}{2}$ pixel (50%)/unit pixel.

Usually, the diameter of the laser beam spot on the surface to be scanned is considered as being optimum when it is 1.1–1.6 times the size of the unit pixel to provide most uniform exposure distribution when all of the pixels are exposed, in consideration of the interference by the adjacent pixels. When the record density is 400 dpi, the laser beam spot diameter is approximately 70–100 microns ($1/e^2$ diameter). Therefore, the ratio of the laser beam spot size to the unit pixel size is 1.1–1.6. In FIGS. 5A and 5B, the laser beam spot diameter is within this range.

When the halftone image is to be recorded using the laser beam spot diameter described above, the exposure distribution on the photosensitive member does not change very much as shown in FIG. 5B, even if the laser beam is turned on and off to provide the pulse width which is 50% of the pulse width providing the maximum density, per unit pixel, and the contrast between the maximum exposure amount and the minimum exposure amount (the contrast will be described in detail hereinafter), is not sufficient (approximately 30%), with the result that the tone gradation in the record by the area change of the dot in each of the pixels provided by the developing process is not stabilized.

When the laser beam spot diameter described above is used, the exposure distribution on the scanned surface has a small amplitude as shown in FIG. 5A and 5B when the laser is turned on and off, the contrast is low with the tendency of the average exposure amount of the scanned surface entirely shifts. When the halftone image is recorded through the PWM system, the surface potential on the photosensitive drum tends more to be shifted as a whole in response to the laser driving pulse width change because of the above-described exposure distributions. Therefore, the produced output image is strongly influenced by the V-D characteristics ($\gamma$ characteristics) which will be described in detail in conjunction with FIG. 9, of the developing system, with the result that the output image density does not change linearly in response to the laser driving pulse width (PWM signal) change (this will be described in conjunction with FIG. 8A). In order to solve this problem, an image processor is conventionally provided with a correction reference table for correcting the PWM signal to provide the linear change of the output image density in consideration of the V-D characteristics of the developing system. However, when the amount of correction by the correcting table is large, there arise problems such as void of the image information, improper tone gradation. In addition, the amount of correction is increased when the V-D characteristics are changed due to the change in the ambient conditions such as ambient temperature and humidity or the like.

SUMMARY OF THE INVENTION

Accordingly, it is a principal object of the present invention to provide an image forming apparatus in which a light beam on-period per one pixel is controlled in accordance with signals indicative of the image to be recorded, thus recording an image, wherein the image can be formed with high resolution and with high tone reproduction.

It is another object of the present invention to provide a color image forming apparatus capable of forming a color image with high resolution and high tone reproduction.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 15A and 15B show on/off of the laser source and output distribution for each pixel of the CCD.

FIG. 16 shows distribution of the laser spot diameter.

DESCRIPTION OF THE PREFERRED EMBODIMENTS

Figure 1:
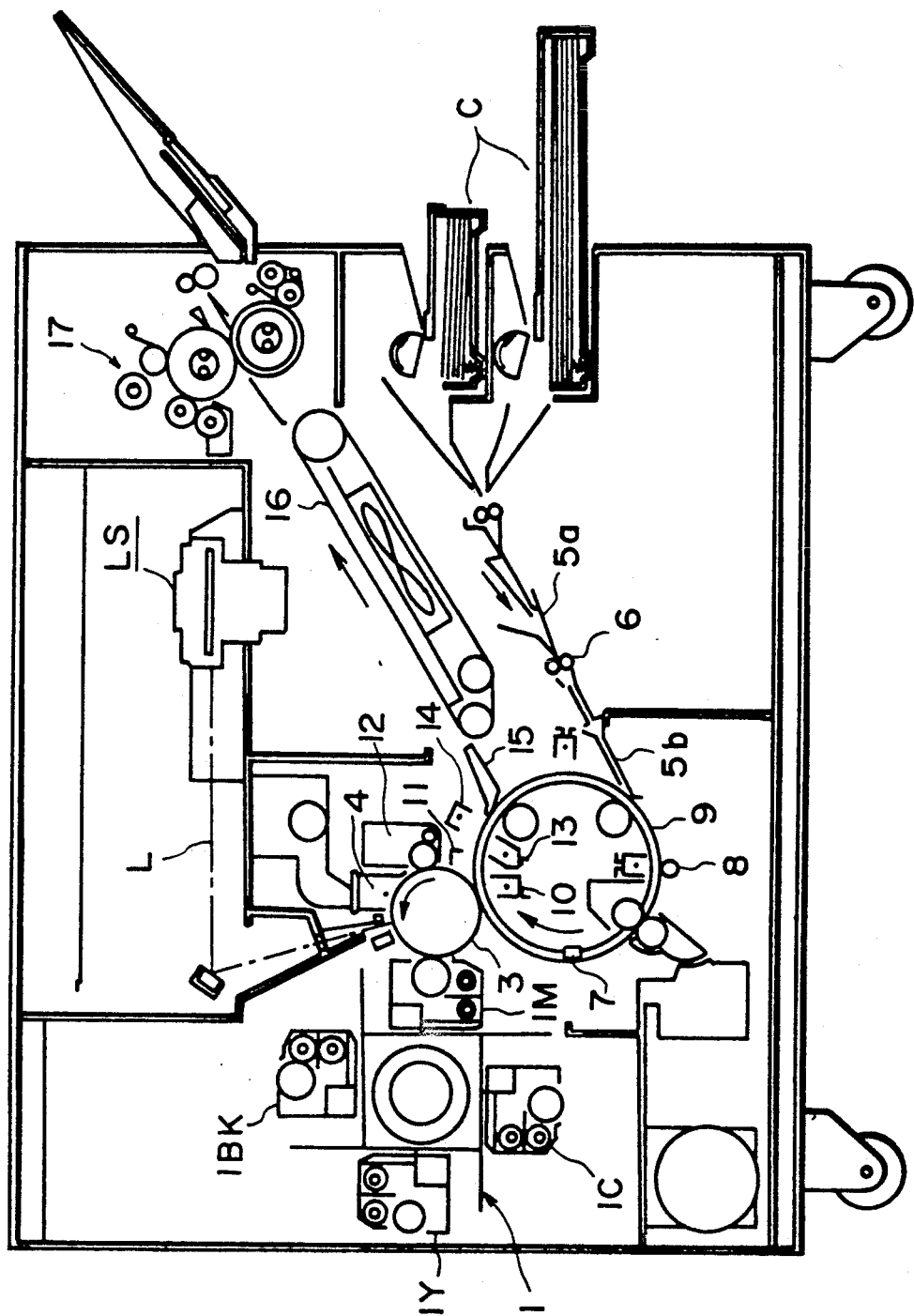
FIG. 1 is a cross-sectional view of an image forming apparatus according to an embodiment of the present invention.

Referring to FIG. 1, there is shown a color printer of an electrophotographic type to which the present invention is applicable.

The printer includes an electrophotographic photosensitive drum 3 (image bearing member) rotatable in a direction of an arrow. Around the photosensitive drum 3, there are disposed a charger 4, a rotary type developing apparatus 1 having developing devices 1M, 1C, 1Y and 1BK, an image transfer discharger 10, cleaning means 12 and a laser beam scanner LS disposed at the upper position in the drawing. These elements constitute an image forming means. Each of the developing devices is effective to supply to the drum 3 a two-component developer comprising toner particles and carrier particles. The developing device 1M contains magenta toner; the developing device 1C contains cyan toner; the developing device 1Y contains yellow toner; and the developing device 1BK contains black toner.

The original to be copied is read by an unshown original reader. The reader has photoelectric transducer elements such as a CCD (charge coupled device) or the like for converting an image of an original to electric signals. It produces image signals corresponding to magenta image information, cyan image information, yellow image information and black-white image information of the original, respectively. A semiconductor laser contained in the printer is controlled in accordance with the image signal to produce a laser beam L. It is possible to print out output signal from a computer.

The sequence of the operation of the color printer will be briefly described, taking as an example the full-color mode. First, the photosensitive drum 3 is uniformly charged by the charger 4. The photosensitive drum 3 is then scanned with and exposed to the laser beam L modulated in accordance with magenta image signal, so that an electrostatic latent image is formed on the photosensitive drum 3. The latent image is reverse-developed by a magenta developing device 1M already brought to the developing position.

The transfer material such as paper is supplied from a cassette C along the sheet guide 5a, a sheet feeding roller 6 and a sheet guide 5b. The transfer material is held by a gripper 7 of a transfer drum 9 and is electrostatically retained thereon by the function of a contact roller 8 and an opposite electrode therefore. The transfer drum 9 rotates in the direction indicated by an arrow in synchronism with the photosensitive drum 3. The magenta developed image provided by the magenta developing device 1M is transferred onto the transfer material by the transfer charger 10 at the transfer station. The transfer drum 9 continues to rotate as it is, and it is prepared for receiving the next color image (cyan in the example of FIG. 1).

On the other hand, the photosensitive drum 3, after being subjected to the image transfer operation, is electrically discharged by the charger 11 and then is cleaned by the cleaning means 12. It is then charged again by the charger 4 and is exposed to the laser beam L now modulated in accordance with the cyan component image signal, so that an electrostatic latent image is formed on the photosensitive drum 3. During this, the developing apparatus 1 rotates to present the cyan developing device 1C to the predetermined developing position to reverse-develop the cyan latent image to form a cyan toner visualized image.

The above process is repeated for the yellow image signal and the black image signal. When the image transfer operations for the four color visualized (toner) image are completed, the transfer material is electrically discharged by chargers 13 and 14, and the gripper 7 is released to permit the transfer material to be separated from the transfer drum 9 by the separation pawl. The separated transfer material is conveyed on the conveyer belt 16 to an image fixing device 17 of heat-pressure-roller type, where the four visualized images overlaid on the transfer material are fixed at once. In this manner, the series of the full-color printing sequential operation is completed, and a full-color print is formed.

Figure 2:
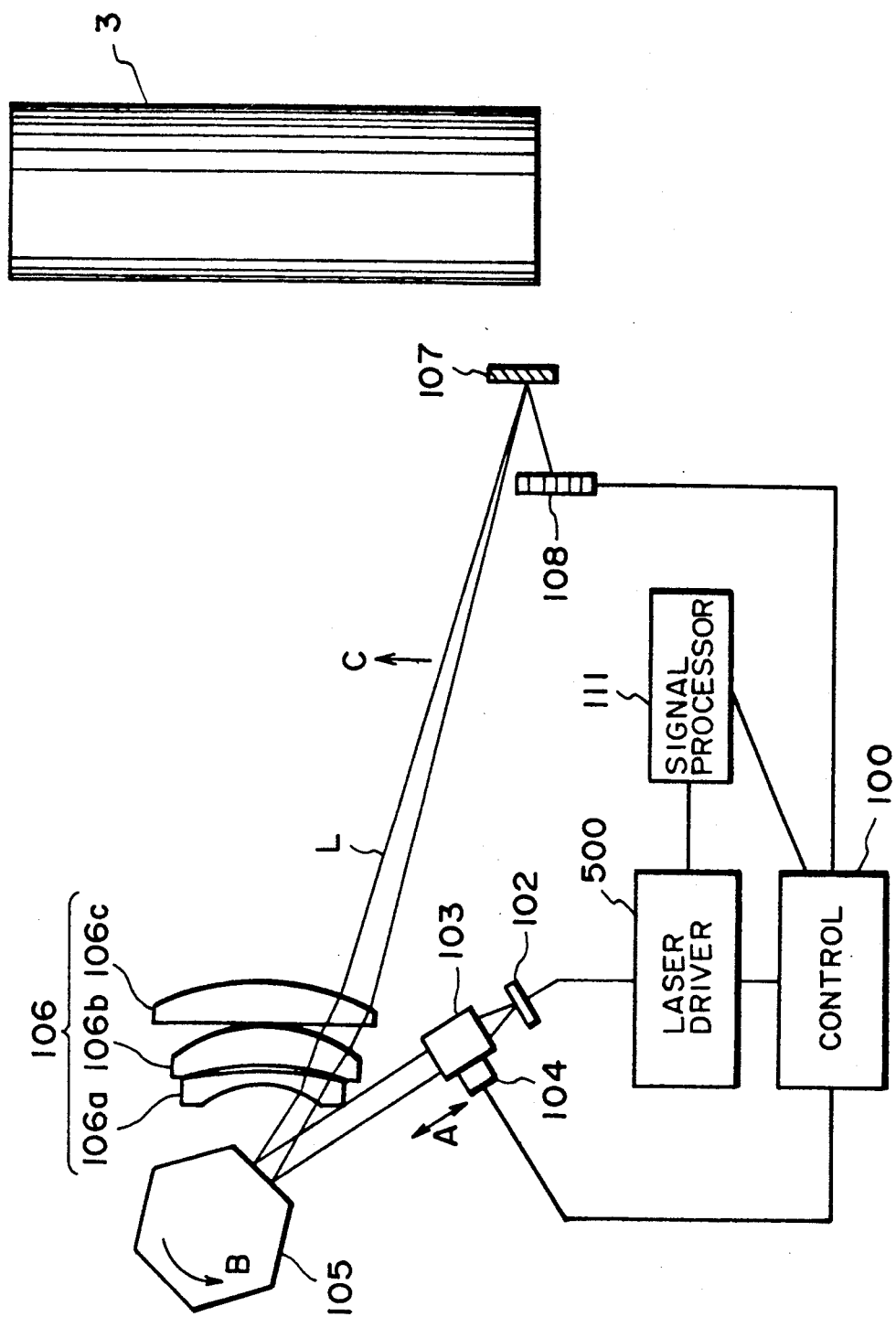
FIG. 2 is a perspective view of an optical system used in the apparatus of FIG. 1.

As shown in FIG. 2, the exposure means includes a semiconductor laser 102, a polygonal mirror 105 rotating at a high speed and an f-θ lens 106. The semiconductor laser 102 produces a laser beam L which is modulated in accordance with time-series digital picture element (pixel) signals produced by the image reader or by an electronic computer or the like. The laser beam L thus produced is projected on the surface of the photosensitive drum. The laser beam L is projected to such a portion of the drum 3 where the toner is to be deposited, and therefore, the developing device reverse-develops the latent image by which the toner particles charged to the same polarity as the charging polarity by the charger 4 is deposited on the right potential portion of the latent image.

With continued reference to FIG. 2, the semiconductor laser element 102 which is the laser source is connected with a laser driver 500 which functions as an emitting signal generator for supplying an emitting signal (driving signal) for producing the laser beam. The laser is energized and deenergized in accordance with the emitting signal of the laser driver. The laser beam L emitted from the laser element 102 is substantially collimated by a collimator lens system 103. The collimator lens system 103 is movable in the direction of an arrow A coaxial with the optical axis of the laser beam by focus adjusting means 104 which includes a rack on which the lens system 103 is fixed, a pinion meshed with the rack and a motor for driving the pinion.

The polygonal mirror, that is, the rotatable mirror 105 having plural reflecting surfaces rotates at a constant speed in the direction of an arrow B to scanningly deflect the collimated beam through the collimator lens system 103. The $f\theta$ lens system 106 (106a, 106b and 106c) disposed in front of the polygonal mirror 105 functions to form a spot on the surface to be scanned, that is, the surface of the photosensitive drum 3 from the laser beam deflected by the polygonal mirror 105, and to provide a constant scanning speed on the surface to be scanned. The direction of movement of the beam L on the drum 3 by the polygonal mirror 105, that is, the direction indicated by the arrow c is called "main scan direction". The main scan direction is a direction with a movement direction of the surface of the drum 3 in the exposure station, preferably substantially perpendicular thereto. On the other hand, the movement detection of the drum 3 in the exposure station is called "sub-scan direction". By the main scan and the sub-scan, the surface of the photosensitive drum 3 is raster-scanned by the laser beam.

Before the start of the modulation in accordance with the signal indicative of the image to be recorded, the laser beam L is directed to a CCD (charge coupled device) 108 functioning as a detecting means, through a reflection mirror 107. The CCD 108 has a number of photoelectric transducer element arranged in the direction C at a position optically equivalent to the surface of the photosensitive drum 3. The CCD 108 is connected with a controller 100 for controlling the laser driver 500 and the focus adjusting means 104.

The signal processor 111 is connected with the laser driver 500 and the controller 100.

With the above structure, when a desired image is to be formed, an image output signal P is supplied from the signal processor 111 to the controller 100, and an image signal S is supplied to the laser driver 500 to turn on and off the laser element 102 in accordance with the image signal S.

By the scanning with the laser beam L, an exposure distribution corresponding to one main scan is formed on the photosensitive drum 3 surface. With each of the main scans, the photosensitive drum 3 is rotated through a predetermined amount, so that a latent image is formed on the photosensitive drum with the exposure distribution corresponding to the image signal S. The image output signal P is supplied to the signal processor 111 prior to the image signal S. After the completion of the supply of the image signal S, the output thereof is terminated. The controller 100 disables the focus adjusting means 104 during the period in which the image processor 111 supplies the image output signal P.

The operation of the focus position adjusting means 104 for the laser beam L will be described.

While the image output signal P is not produced, an actuation signal is supplied from the controller 100 to the laser driver 500. From the laser driver 500, a rectangular wave turned on and off at regular intervals as shown in FIG. 15A is generated for a predetermined period of time, and in accordance with the test signal, the laser element 102 is turned on and off. The laser beam modulated in accordance with the test signal is reflected by the reflection mirror 107 and is projected and scan the CCD 108 disposed at a position optically equivalent with the photosensitive drum 3.

The controller 100 clear the accumulated charge of the photoelectric transducer elements of the CCD 108 before the laser beam L scans the CCD 108. After an electric charge is accumulated on the photoelectric transducer elements of the CCD 108 by one line scanning with the laser beam modulated in accordance with the test signal, the charge is read as an electric signal.

The exposure amount distribution on the CCD 108 is as shown in FIG. 16 in which the distribution pattern is in accordance with the spot diameter of the laser beam L. Therefore, the distribution of the outputs of the photoelectric transducer elements of the CCD 108 is as shown in FIG. 15B, and the signal representing it is supplied to the controller 100. The controller 100 calculates a contrast V which is defined by:

$$V = (\theta max - \theta min)/(\theta max + \theta min) \qquad (1)$$

where $\theta$max is the maximum of the output of the CCD, and $\theta$min is the minimum of the output. The value V is associated with a laser beam spot diameter measured in the scanning direction on the photosensitive drum. More particularly, in this case, the contrast V defined above increases with a decrease of the spot diameter in the scanning direction.

Therefore, the comparison is made between a predetermined contrast Vo (which corresponds to a target spot diameter of the laser beam in the scanning direction on the photosensitive drum) and the contrast V calculated by the equation (1). If the contrast V is not equal to the predetermined contrast level Vo, the controller 100 produces a driving signal to the focus adjusting means 104 to shift the collimator lens system 103 in the direction A through a distance corresponding to the difference between the contrasts V and Vo. At the position of the collimator lens 103 after the movement, the contrast V is again measured, and the collimator lens 103 is finally fixed at a position where the contrasts V and Vo are equal. By doing so, the focus deviation of the optical system attributable to the thermal expansion of the supporting means or the like can be corrected to minimize the diameter of the scanning spot of the laser beam L.

It is preferable that the spot diameter control operation for the laser beam is performed immediately before each start of the electrostatic latent image formations for the color components. By the laser beam spot diameter control, a desired spot diameter can be obtained, and therefore, good image forming operation can be performed.

Figure 3:
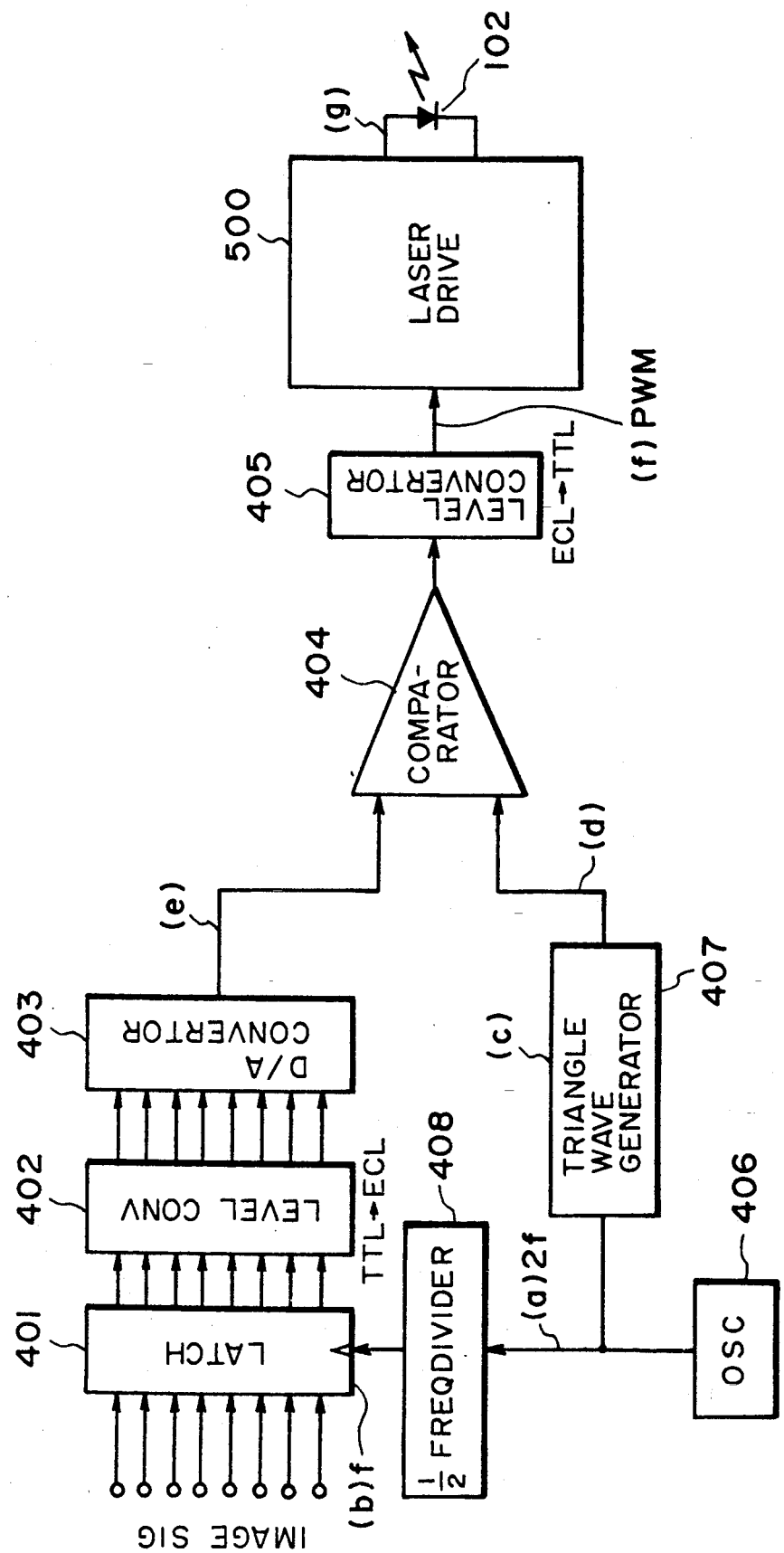
FIGS. 3 and 4 show a pulse width modulating circuit used in the apparatus of FIG. 1 and signal waveforms therefrom, respectively.

Referring to FIG. 3, the PWM circuit will be described. In FIG. 3, the PWM circuit includes a TTL latching circuit 401 for latching 8 bit image signal, a level converter 402 for converting the TTL logic level into a high speed ECL logic level, an ECLD-A converter 403, an ECL converter 404 for producing the PWM signal, a level converter 405 for converting the ECL logic level to the TTL logic level. A clock generator 406 for producing clock signals 2f having the frequency which is twice of the pixel clock signal f, a triangular wave generator 407 for generating substantially ideally triangular wave signal in synchronism with the clock signal 2f, and ½ frequency divider 408 for dividing the frequency of the clock signal 2f by 2. For the purpose of high speed operation in the circuit, the ECL logic circuit is disposed at various parts.

Figure 4:
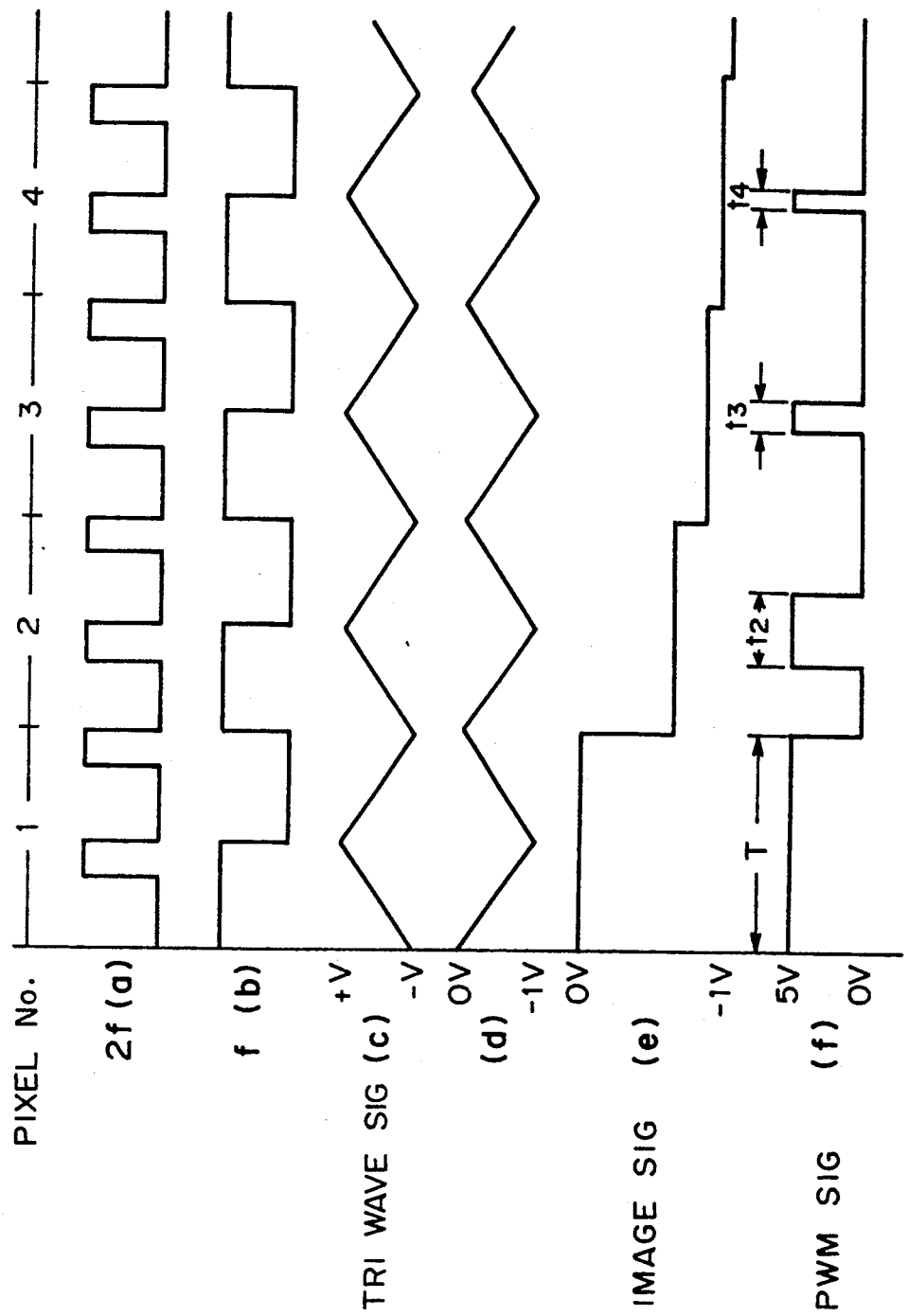

Referring also to FIG. 4, the description will be made as to the operation of the circuit, FIG. 4 showing the waveform of the signal.

A signal (a) is a clock signal 2f, and signal (b) is a pixel clock signal f having a double frequency, and is associated with the pixel number, as shown in the Figure. In order to maintain the duty ratio of 50% of the triangular signal also in the triangular wave generator 407, the clock signal 2f is temporarily divided by 2, and then, the triangular signal (c) is generated. Further, the triangular signal (c) is converted to the ECL level (0 − −1 V), and is now the triangular wave signal (d).

On the other hand, the pixel signal varies over the range of 256 tone gradation levels from OOH (white)-FFH (black). The mark H represents hexa-expression. The image signal (e) shows the ECL voltage level after the D/A conversion. In FIG. 4, the first pixel has the FFH voltage level which is for the maximum density; the second pixel has the 80 H voltage level which is intermediate; the third pixel has the 40 H voltage level which is for an intermediate density level lower than the second pixel; and the fourth picture element has the 20 H voltage level which is for an intermediate density lower than the third pixel.

A comparator 404 compares the triangular signal (d) and the image signal (e), and produces PWM signals having pulse widths corresponding to the pixel density to be formed. In the example of FIG. 1, these pulse widths are indicated by T, $t_2$, $t_3$ and $t_4$, where $T > t_2 > t_3 > t_4$. The PWM signals are converted to the TTL levels which are either 0 V or 5 V into the PWM signals (f) which is a laser driving pulse signals (256 kinds of signals including zero). The PWM signals (f) are supplied to the laser driving circuit 500. Thus, the semiconductor laser 102 emits, for each of the pixels, a laser beam for a period corresponding to each of the pulse widths of the signals (f) to scanningly expose the photosensitive member 3 thereto. In the printer of this embodiment, the reverse development is effected, and therefore, the laser beam emitting period is longer if the image density is higher.

In the circuit of FIG. 3, the upstream side of the latching circuit 401 is equipped with an unshown look-up table. The look-up table is for a γ correction (tone gradation correction) of the image data and is the memory storing the γ-corrected data. The memory is accessed by the address data which is the 8-bit image signal per picture element, so that the γ-corrected image signal is outputted. Usually, a particular one γ-correction table is used in one frame or page, but it is possible that several kinds of γ-correction tables are prepared, and some of them are used selectively in the frame. That is, three tables are sequentially and repeatedly used for the respective line scans by the beam, so that the γ-correction in the sub-scan direction is changed line by line to correct the tone gradation.

The look-up table or tables are prepared so that the correction thereof is not influenced by the densities inherent to the respective color toners, i.e., the yellow toner, the magenta toner, the cyan toner and the black toner. More particularly, when the density of the toner is low, the correction table is prepared on the basis of a steep γ curve, whereas when the density is high, the opposite property γ table is prepared. Thus, the γ tables are provided for the respective colors. Upstream of the look-up table, it is possible that a non-linear color masking circuit, for example, a secondary color masking circuit, may be provided to correct turbidity.

Figure 13:
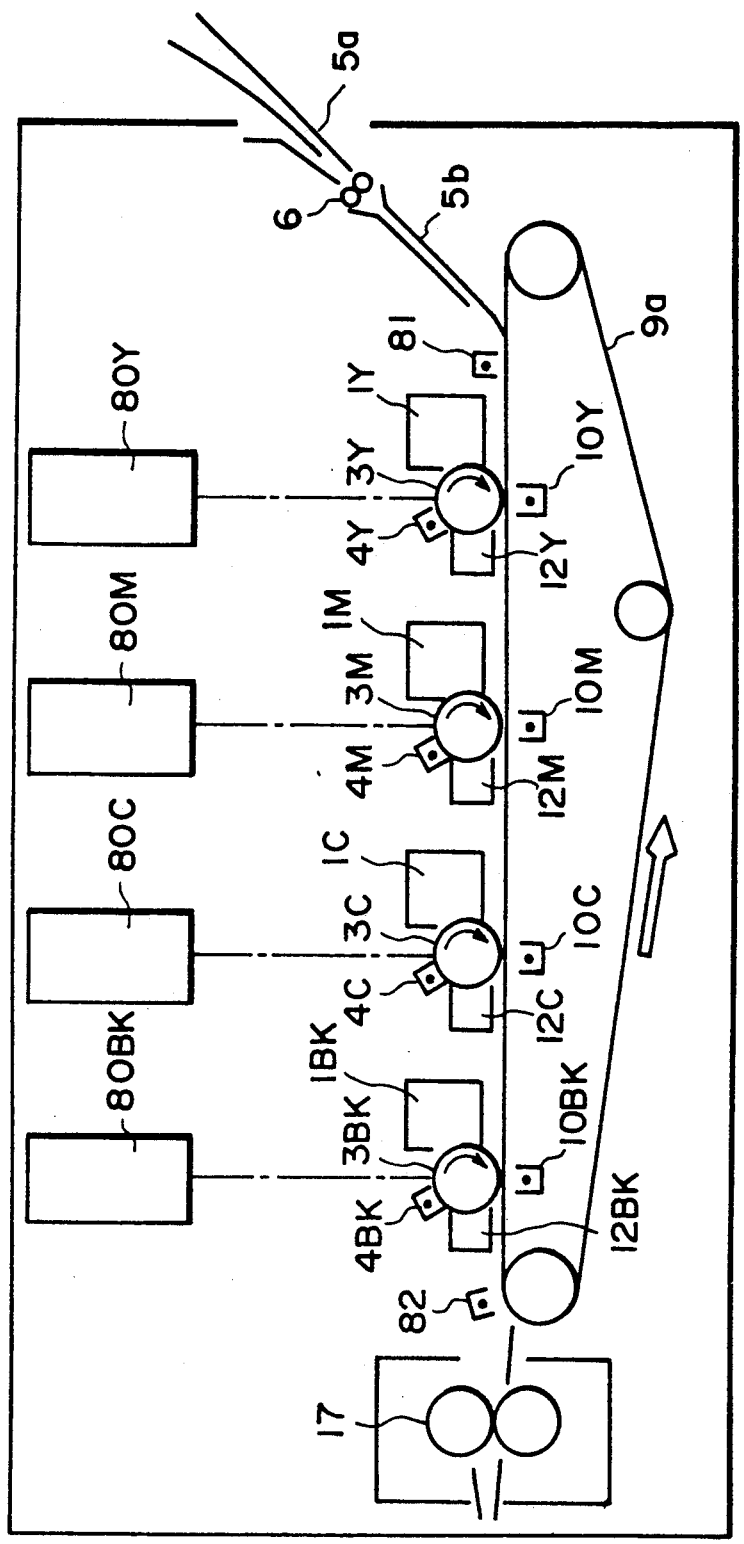
FIG. 13 is a somewhat schematic view of an image forming apparatus according to another embodiment of the present invention.

In the color printer shown in FIG. 1, the PWM circuit (FIG. 3) is sequentially supplied with the yellow, the magenta, the cyan and the black image signals for each of the pages (one page of the original and copy). The image signals are sequentially modulated for the respective colors. By four rotations of the drum 3, one color copy is produced. In the apparatus of FIG. 13 which will be described hereinafter, the PWM circuit is provided for each of the colors.

In this embodiment at the upstream of the look-up table provided for each of the colors, a non-linear masking circuit is provided to correct the turbidity for each of the colors. The masking circuit is in the form of a secondary color masking circuit, for example. This is effective, together with the use of the small size laser spot and the small size toner particles which will be described hereinafter, to provide finer and high grade color images with good tone gradation and color reproduction.

Figure 5A:
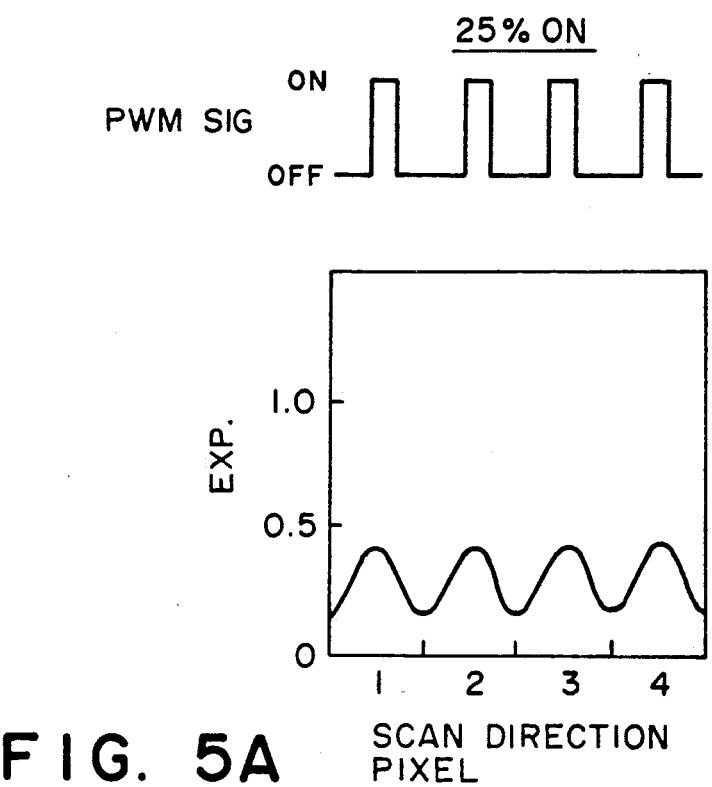
FIGS. 5A and 5B show exposure distributions on a photosensitive member in a conventional apparatus.
Figure 5B:
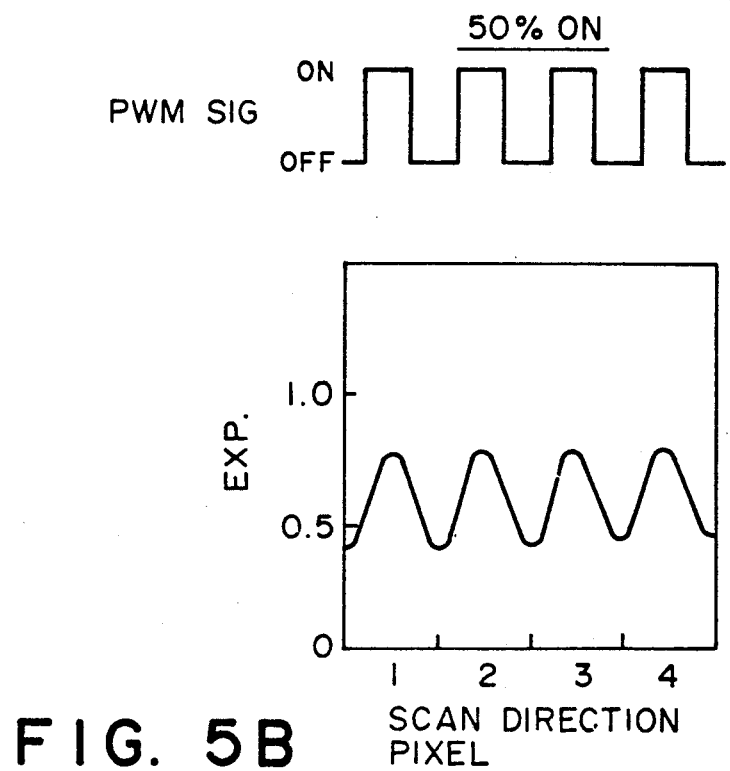

When a small size spot is imaged from the pulse width modulated laser beam on the photosensitive drum through the optical system shown in FIG. 2 to form a tone gradation, the exposure distribution on the photosensitive drum surface is as shown in FIG. 5B, where the beam spot diameter measured along the main scan direction on the drum surface is 1.1–1.6 times the size of the unit pixel record measured in the main scan direction, even if the laser beam is rendered on and off for a unit pixel with the pulse width of 50% of the maximum pulse width corresponding to the maximum density. The contrast which has been defined hereinbefore between the maximum and minimum levels of the exposure amount is as small as approximately 30%, with the result that the subsequent development process does not provide the stabilized tone gradation utilizing the area change in each of the dots.

Various experiments and investigations made by the inventors have revealed that in order to stabilize the tone reproduction by area change per dot using the pulse width modulation of the laser beam, the contrast defined hereinbefore in the exposure distribution on the image bearing member is not less than approximately 80% when the laser beam is rendered on and off with the pulse width of 50% of the above-described maximum pulse width, for example.

Referring to FIG. 6, the comparison will be made between when the ratio of the beam spot size measured in the detection of the main scan on the image bearing member to the size of the recording pixel measured in the direction of the main scan (spot size ratio) is not more than 0.7 and when it is larger than 0.7 as in the prior art.

It is added here that the strength distribution of the laser spot is a Gaussian distribution. Therefore, when the beam spot diameter or size referred to in this Specification is the so-called $1/e^2$ diameter, that is a diameter of a circumferential line connecting the points, in the distribution, which have the strength of the $1/e^2$ multiplied by the maximum strength.

Figure 6A:
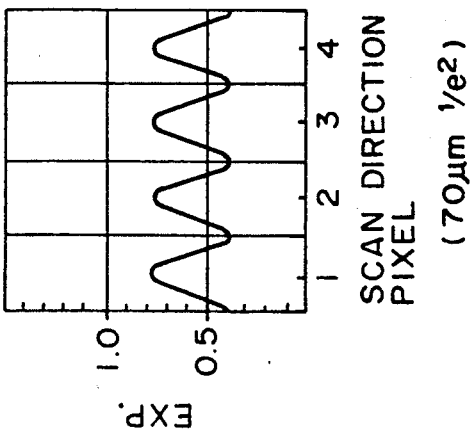
FIGS. 6A, 6B and 6C show exposure distributions on the photosensitive member.
Figure 6B:
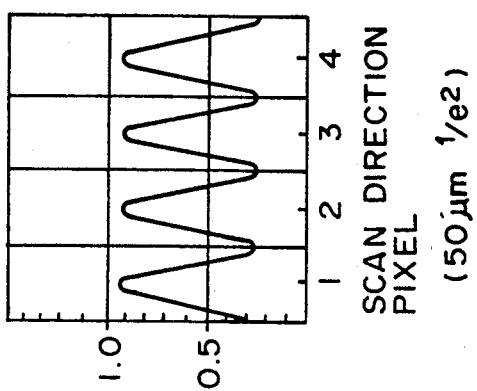
Figure 6C:
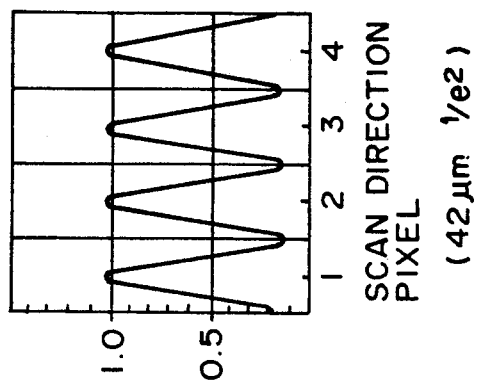

FIGS. 6A, 6B and 6C show the exposure distribution on the drum surface under the condition that the recording density is 400 dpi (unit pixel size is 63.5 microns), in a case (A) wherein the laser beam spot size is 1.1 times (70 microns) the picture element size (FIG. 6A), in a case (B) wherein it is 0.8 times (50 microns) (FIG. 6C), and in a case (C) wherein it is 0.7 times (42 microns) (FIG. 6C). The contrasts provided in these cases are shown in Table 1 below.

TABLE 1

|  | (A) | (B) | (C) |
| --- | --- | --- | --- |
| Spot size ratio | 1.1 | 0.8 | 0.7 |
| Pulse width | 50% ON | 50% ON | 50% ON |
| Contrast | 30% | 60% | 85% |

As will be understood from the above Table 1, the contrasts of the exposure distribution are approximately 30% (case (A)), approximately 60% (case (B)) and approximately 80% (case (C)) when the laser beam is rendered on and off with the pulse width of 50% of the maximum driving pulse width, for each of the picture elements. Thus, it is understood that the contrast not less than 80% can be provided by selecting the laser beam spot size measured in the main scan direction ($1/e^2$ size) to be not more than 0.7 times the picture element size measured in the main scan direction.

Figure 7A:
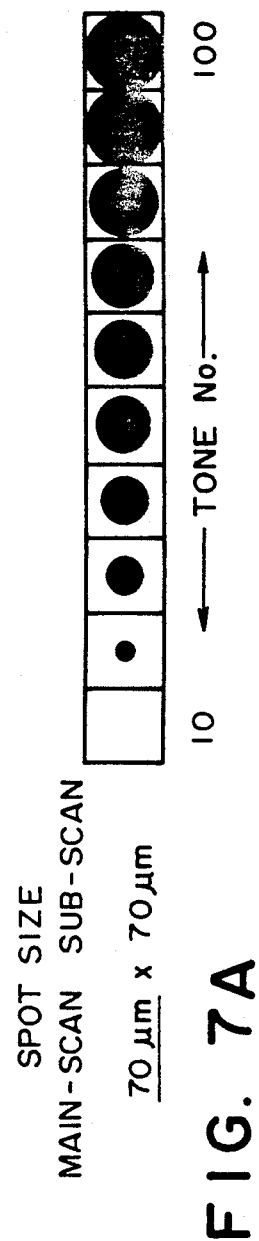
FIGS. 7A and 7B illustrate tone production by area change of the dot.
Figure 7B:
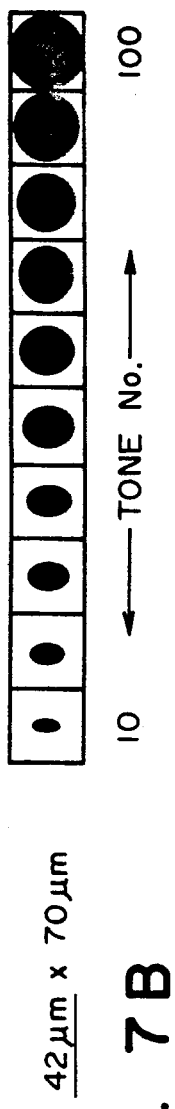

FIGS. 7A and 7B show the configuration range of the dot provided by forming a latent image and developing it by the subsequent developing process, when the laser driving pulse width is changed from 10%–100% of the maximum driving pulse width, for each of the spot diameters. The spot size measured in the sub-scan direction was 1.1 times the picture element size measured in the sub-scan direction (70 microns) as in the prior art to make the exposure distribution uniform in the sub-scan direction.

Figure 8:
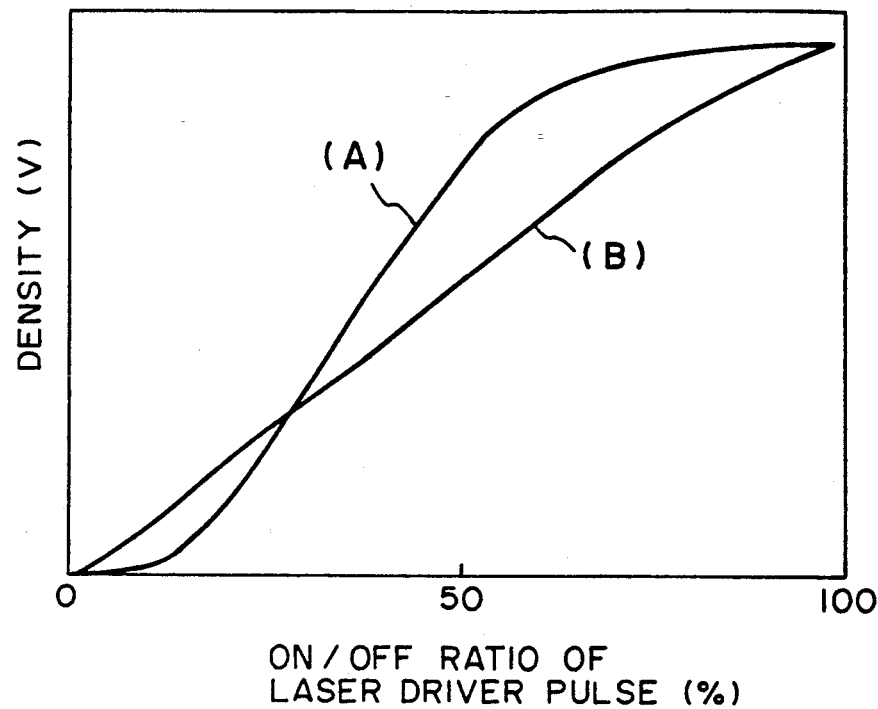
FIG. 8 is a graph showing a V/D characteristics of a known developing system.

FIG. 8 is a graph showing the results illustrated in FIGS. 7A and 7B. In FIG. 8, the abscissa represents a width of the laser driving pulse (a ratio relative to the maximum pulse width for one picture element); and the ordinate represents the density (reflection density) of the resultant image developed.

Figure 9:
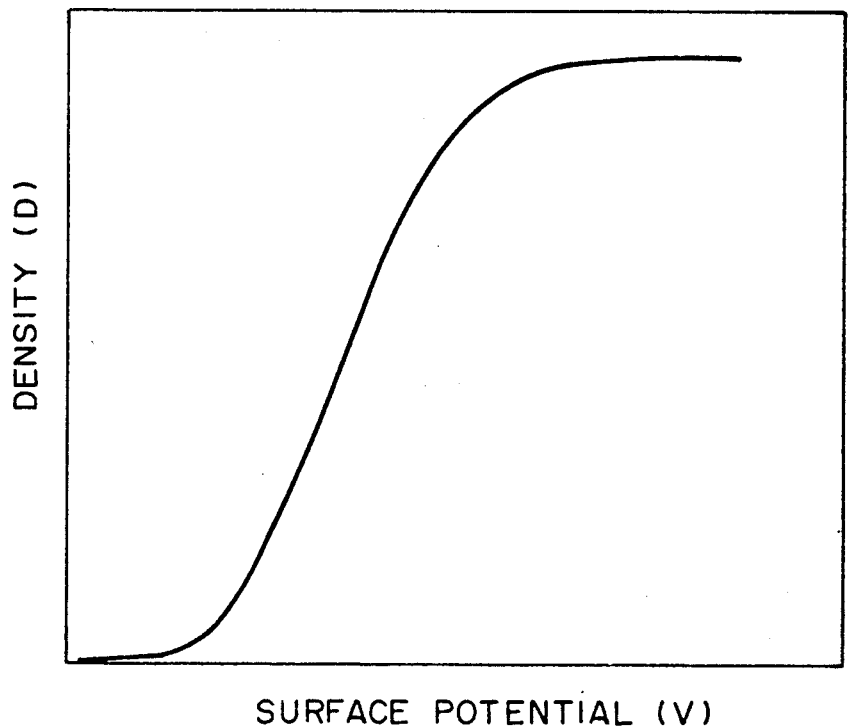
FIG. 9 is a graph showing the relation between the pulse width modulation and the image density in accordance with the present invention.

FIG. 9 shows the V-D characteristics (tone gradation characteristics) of the development system. In FIG. 9, the abscissa represents a surface potential of the photosensitive member; and the ordinate represents a density (reflection density) of the resultant developed image.

Generally speaking, a developing system has a threshold characteristics wherein the developing action suddenly occurs at a predetermined level of the surface potential of the photosensitive member, as shown in FIG. 9. Therefore, when the contrast of the exposure distribution is low as shown in FIG. 7A, the surface potential of the photosensitive drum changes has a whole, and therefore, as shown in FIG. 8A, the developer is deposited on the surface of the photosensitive drum abruptly where the surface potential exceeds the threshold level. As a result, as shown in FIG. 7A, the size of the developed dot abruptly increases at a certain number of gradation level.

On the contrary, where the laser beam spot size measured in the main scan direction is 0.7 times the unit pixel size to provide not less than 80% contrast of the exposure distribution in one pixel, the pattern of the latent image formed on the photosensitive drum has the high potential contrast in accordance with the exposure distribution. Therefore, even if the latent image is developed by a developing system having a certain threshold level characteristic, the exposure distribution has a higher level immediately from a short driving pulse region to such an extent that the development threshold level is exceeded, and therefore, it is stably developed as a dot (FIG. 7B). As a result, the pixel can be reproduced with the stably changed dot size from the region having the smaller on/off ratio of the driving pulse, by which the area changing gradation is stably effected.

FIG. 8B shows the image density vs. the laser driving pulse when the spot diameter ratio described above is used. As will be apparent from this Figure, the image formation is not much influenced by the developing system, and the stable area changing gradation is possible in one pixel. Therefore, even if the ambient temperature, humidity or the like changes with the result of the change in the threshold level of the developing system, the influence by such a change is minimized since the image recording according to the present invention is not easily influenced by the V-D characteristics in the neighborhood of the threshold level. Thus, the tone reproduction is further stabilized.

In addition, even if the correcting reference table for the correction of the PWM signals is such that the output image density changes more linearly in the image signal processing circuit, the missing of the image information and the skipping of the tone reproduction resulting from the correction can be suppressed, since the amount of correction can be made very small. Thus, the present invention is effective to minimize the occurrence thereof, and in addition, the correction error due to the change in the developing properties attributable to the ambient condition change can be suppressed.

As described hereinbelow, the laser beam spot size measured in the main scan direction on the photosensitive member is not more than 0.7 times the unit pixel size measured in the main scan direction. Theoretically, the lower limit of the size is 0, however, practically, it is difficult to reduce the size to lower than 20 microns. However, the size of the laser spot measured in the sub-scan direction is preferably not less than 1.1 and not more than 1.6 times the unit pixel size measured in the sub-scan direction in order to make the exposure distribution uniform in the sub-scan direction. Therefore, in the present invention, the configuration of the laser beam spot formed on the photosensitive member is oval having a minor axis substantially in the main scan direction and a major axis substantially in the sub-scan direction.

As regards the unit pixel, in order to provide the equivalent recording density in the main scan direction and the sub-scan direction, it is desirable that the size of the pixel in the main scan direction is the same as in the sub-scan direction.

In order to provide the laser beam spot size and configuration on the photosensitive member as described above, the use is made with a semiconductor laser emitting a laser beam having a proper angle of divergence and lenses 103 and 106 having proper power. The selection or selections may be made without difficulty within the scope of the present invention.

Even if the good tone reproduction can be provided by the present invention, the image quality at the high light portion may be roughened as the case may be due to the toner scattering during the image transfer and/or image fixing operation.

As a result of various experiments and investigations, it has been found that this problem can be solved by adjusting the particle size distribution of the toner and-/or the volume average particle size of the toner.

More particularly, according to this invention, the toner particles contain not less than 90% by volume toner particles satisfying $(\frac{1}{2})M<r<(3/2)M$ where r is a particle size of the toner, and M is a volume average particle size of the toner, and the toner particles also contain not less than 99% by volume of the toner particles satisfying $0<r<2M$.

Further, according to the present invention, the volume average particle size of the toner is not more than 12 microns, further preferably, not more than 9 microns, even further preferably not more than 8 microns and not less than 4 microns.

When the toner has a volume distribution outside the range, the effects are not sufficiently provided even if the average particle size is changed.

When the percentage of the toner particles in the large particle size region in the volume distribution, the number of toner particles having large sizes which are contributable to the toner scattering during the image transfer operation does not decrease even if the average particle size is reduced. Therefore, it is difficult to decrease the roughness in the low image density area in the produced image by reducing the average particle size. On the other hand, if the number of toner particles in the small diameter region in the volume distribution is increased, the number of toner particles deposited on and not attached from the carrier particles is relatively increased, and therefore, the carrier particles are not able to triboelectrically charge the toner particles with high efficiency, so that the toner scattering from the developing device is increased and that the production of the foggy background is increased. The toner having small particle size is relatively easily fused on the surface of the carrier particles with the result of the deterioration of the carrier particles and of the toner scattering increased.

Figure 10:
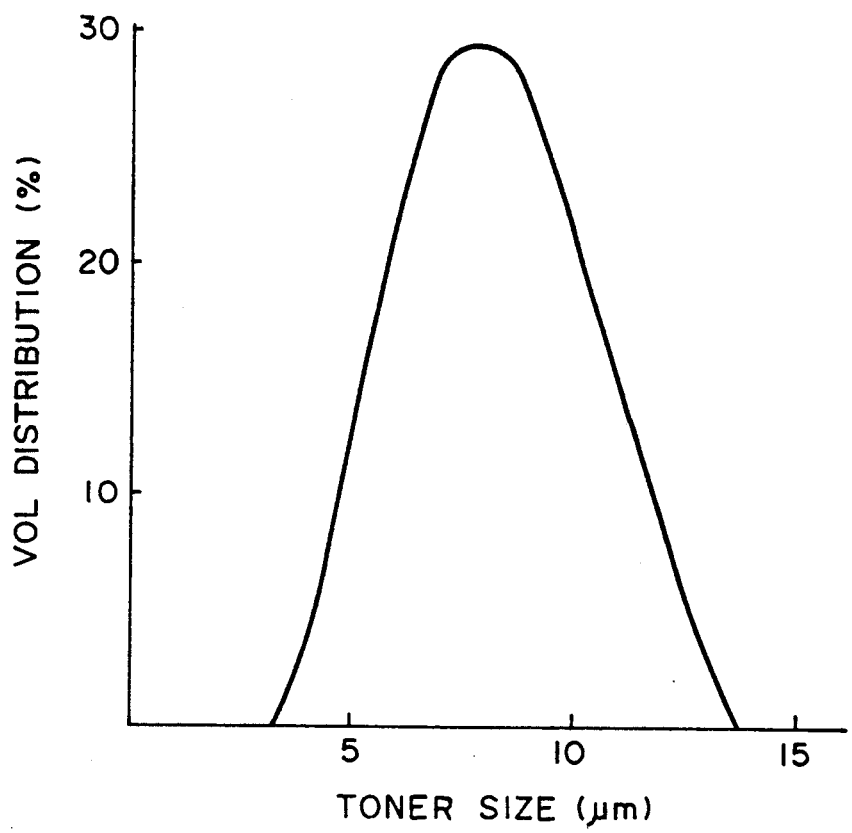
FIG. 10 is a graph showing toner particle size distribution of the toner used in the apparatus according to the embodiment of the present invention.

For the reasons stated above, the desired volume distribution is as in FIG. 10 wherein the distribution is sharp.

Figure 11:
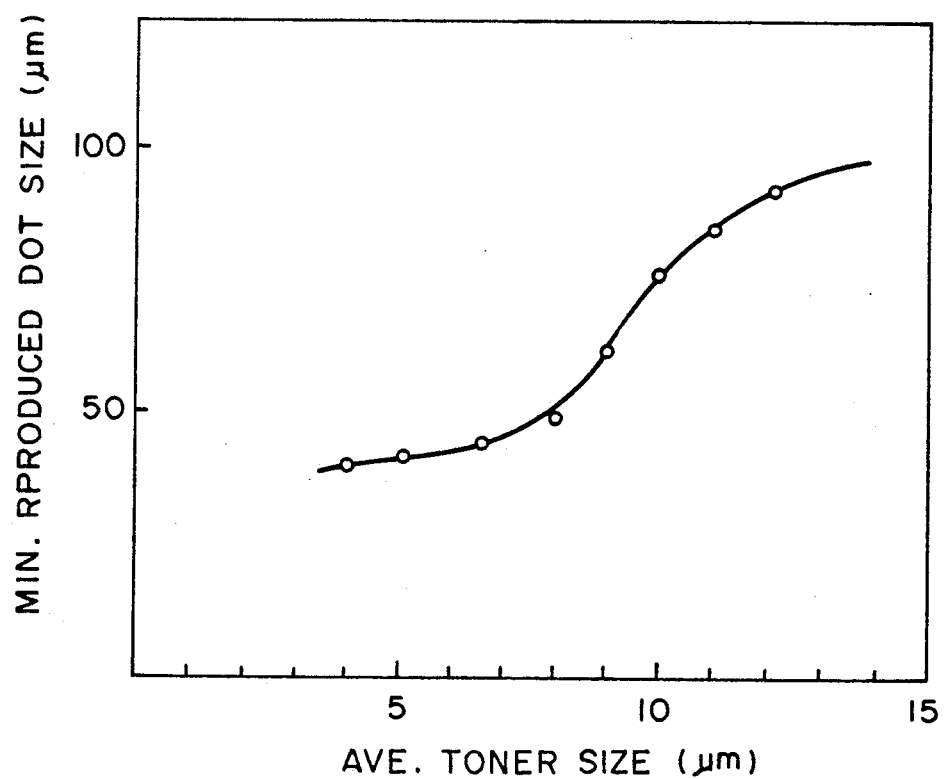
FIG. 11 is a graph showing the relation between the average particle size of the toner and the minimum reproducible dot diameter.

FIG. 11 is a graph showing a relation between the volume average particle size of the toner and the size of the dot of the minimum reproduction in the image after the image fixing operation when the laser beam spot is oval having a diameter of 70 microns in the sub-scan direction and a diameter of 42 microns in the main scan direction, and when the latent image is formed on the photosensitive drum and is developed into a toner image which is in turn transferred and fixed.

The developing conditions were changed for each of the toner particle sizes, by, for example, using a DC biased AC developing bias or a DC bias, by changing the material of magnetic carrier particles, by changing the sleeve-drum clearance or by changing the sleeve-blade clearance. However, they hardly influenced the diameter of the minimum reproduced that. This may be described in the following manner.

In the system wherein a latent image is written by the control of the on-period of the laser beam, the density tone gradation of the development is improved with the reduction of the size of the laser spot size. However, when the images are transferred and fixed a plurality of times in order to obtain a full-color image, the large size toner particles scatter with the result of a larger dot. On the contrary, the small size toner particles are not easily scattered, so that the image is not much disturbed. This is because the small size toner particles constitute a thin layer on the transfer sheet after the image transfer, and therefore, the attraction force with the sheet is large. Therefore, even when the toner image is subjected to the image transfer electric field a plurality of times, they are not easily scattered.

The reproducibility in the full-color image at the low image density area, is remarkably conspicuous in the image. The impression of the image is significantly different depending on whether or not the dots having the size of approximately 50 microns are faithfully reproduced or not, when the tone full-color image is to be formed. Therefore, according to this embodiment, the laser beam spot size in the main scan direction is not more than 42 microns under the condition that the recording density is 400 dpi; the toner has a volume average particle size of not more than 9 microns, further preferably not more than 8 microns. By doing so, the dot having the size of approximately 50 microns can be faithfully reproduced, and the scattering during the image transfer operation is extremely reduced. In addition, the tone reproducibility in the low density portions in the full-color image is sufficient as contrasted to the conventional method, and the fine image can be provided with low roughness or blurness.

With the above advantageous effects, particularly when the volume average particle size of the toner is not more than 8 microns, the dot having the size not more than 50 microns is faithfully reproduced, and in addition, the image is not disturbed even if it is subjected to the image transfer electric field a plurality of times. Particularly, this tendency contributes to the reproducibility and the reduction of the image roughness in the low density portion.

When the toner has the volume average particle size of 6 microns, it is preferable that the volume distribution of the toner is such that they contain not less than 90% by volume of toner particles having a size exceeding 3 microns and not exceeding 9 microns, and that they contain not less than 99% by volume of the toner particles having a size larger than 0 and smaller than 12 microns.

The volume distribution and the volume average particle size of the toner are measured in the following manner:

A Coalter Counter TA-II (Coalter Corporation) is used. To the counter, an interface (Nikkaki Kabushiki Kaisha, Japan) outputting a number average distribution and a volume average distribution, and CX-i personal computer (Canon Kabushiki Kaisha, Japan) are connected. Using electrolyte (first class natrium chloride), 1% NaCl water solution is prepared.

To the electrolyte solution (100–150 ml), 0.1–5 ml of surface active agent (dispersing agent) (preferably alkylbenzene sulfonate) is added. Further, 0.5–50 mg of the material to be tested is added thereto.

The electrolyte suspending the material is subjected to the ultrasonic dispersing treatment for approximately 1–3 min. Using an aperture of 100 microns, the particle size distribution in the range of 2–40 microns is measured using the counter TA-II to obtain the volume distribution.

From the volume distribution obtained, the volume average particle size of the material is obtained.

In order to produce the toner particles having the sharp particle size distribution, as described hereinbefore, the following method is preferable. The material for the toner is melted and kneaded. It is then cooled and pulverized, and the pulverized particles are finely classified. Thereafter, the toner is provided having the desired particle size distribution and/or the volume average particle size.

In order to effect the precise classification, the pulverized powder product may preferably be classified by a fixed-wall type wind-force classifier to obtain a classified powder product, and ultra-fine powder and coarse powder are simultaneously and precisely removed from the classified powder by means of a multi-division classifier utilizing a Coanda effect (e.g., Elbow Jet Classifier available from Nittetsu Kogyo K.K.), thereby to obtain a toner having a prescribed particle size distribution and/or volumeaverage particle size.

In the present invention, the term "toner" may include colored resin particles (comprising a binder resin and a colorant and another optional additive) per se, and colored resin particles to which an external additive such as hydrophobic colloidal silica has been externally added.

The binder resin used for the toner may for example include: styrene-type copolymers such as styrene-acrylic acid ester resins and styrene-methacrylic acid ester resins; and polyester resins.

In view of color mixing characteristics at the time of fixing, particularly preferred resins may be polyester resins obtained through polycondensation of at least a diol component selected from bisphenol derivatives represented by the formula:

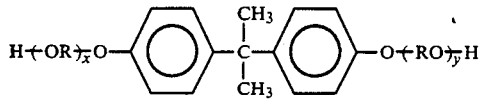

wherein R denotes an ethylene or propylene group; x and y are respectively a positive integer of 1 or more providing the sum (x+y) of 2 to 10 on an average, and their substitution derivatives, and a two- or more-functioned carboxylic acid component or its anhydride or its lower alkyl ester, such as fumaric acid, maleic acid, maleic anhydride, phthalic acid, terephthalic acid and the like. Such polyester resins may show a sharp melting characteristic.

Examples of the colorants suitable for the purpose of the present invention may include the following pigments or dyes. Not recommendables are C.I. Disperse Y164, C.I. solvent Y77 and C.I. Solvent Y93, which exhibit low light stability.

Examples of the dyes may include: C.I. Direct Red 1, C.I. Direct Red 4, C.I. Acid Red 1, C.I. Basic Red 1, C.I. Mordant Red 30, C.I. Direct Blue 1, C.I. Direct Blue 2, C.I. Acid Blue 9, C.I. Acid Blue 15, C.I. Basic Blue 3, C.I. Basic Blue 5, and C.I. Mordant Blue 7.

Examples of the pigments may include: Naphthol Yellow S, Hansa Yellow G, Permanent Yellow NCG, Permanent Orange GTR, Pyrazolone Orange, Benzidine Orange G, Permanent Red 4R, Watching Red calcium salt, Brilliant Carmine 3B, Fast Violet B, Methyl Violet Lake, Phthalocyanine Blue, Fast Sky Blue, and Indanthrene Blue BC.

Particularly preferred pigments may include disazo yellow pigments, insoluble azo pigments and copper phthalocyanine pigments, and particularly preferred dyes may include basic dyes and oil soluble dyes.

Particularly preferred examples may include: C.I. Pigment Yellow 17, C.I. Pigment Yellow 15, C.I. Pigment Yellow 13, C.I. Pigment Yellow 14, C.I. Pigment Yellow 12, C.I. Pigment Red 5, C.I. Pigment Red 3, C.I. Pigment Red 2, C.I. Pigment Red 6, C.I. Pigment Red 7, C.I. Pigment Blue 15, C.I. Pigment Blue 16, copper phthalocyanine pigments having two or three carboxybenzamidomethyl groups, and copper phthalocyanine pigments.

Particularly preferred examples of dyes may include: C.I. Solvent Red 49, C.I. Solvent Red 52, C.I. Solvent Red 109, C.I. Basic Red 12, C.I. Basic Red 1 and C.I. Basic Red 3B.

As for the content of the colorant, a yellow colorant for providing a yellow toner, which sensitively affects the transparency of an OHP film, may preferably be used in a proportion of 0.1 to 12 wt. parts, more preferably 0.5–7 wt. parts, per 100 wt. parts of the binder resin. A proportion of more than 12 wt. parts provides a poor reproducibility of mixed colored of yellow, such as green, red and skin color.

A magenta colorant and a cyan colorant for providing the magenta and cyan toners, respectively, may preferably be used in a proportion of 15 wt. parts, more preferably 0.1–9 wt. parts, per 100 wt. parts of the binder resin.

In case of a black toner contained two or more colorants in combination, the addition of more than 20 wt. parts in total is liable to cause spending thereof to the carrier and cause the colorants to be exposed on the toner surface, thus inviting increased sticking of the toner onto the photosensitive drum to instabilize the fixability. For this reason, the amount of the colorants in the black toner should preferably be 3 to 15 wt. parts per 100 wt. parts of the binder resin.

A preferred combination of colorants for providing a black toner may be that of a disazo type yellow pigment, a monoazo-type red pigment and a copper phthalocyanine-type blue pigment. The proportional ratios of the yellow pigment, the red pigment and the blue pigment may preferably be 1:1.5 to 2.5:0.5 to 1.5.

It is also preferred to add a charge control agent in order to stabilize the negative chargeability to the toner according to the present invention. In this instance, it is preferred to use a colorless or thin-colored negative charge control agent so as not to affect the color toner of the toner. The magnetic charge control agent may for example be an organo-metal complex such as a metal complex of alkyl-substituted salicylic acid (e.g., chromium complex or zinc complex of di-tertiary-butylsalicylic acid). The negative charge control agent may be added to a toner in a proportion of 0.1 to 10 wt. parts, preferably 0.5 to 8 wt. parts, per 100 wt. parts of the binder resin.

When the developer used in the present invention is a two-component developer comprising a carrier and a toner, the carrier may preferably comprise magnetic particles. The magnetic particles may preferably be those comprising ferrite particles (maximum magnetization: 60 emu/g) which have been coated with a resin so that they have a particle size of 30–100 microns, more preferably 40–80 microns, an electric resistivity of $10^7$ ohm.cm or more, more preferably $10^8$ ohm.cm or more.

The resistivity of the magnetic particles is measured with a sandwiching-type cell having a measuring electrode area of 4 cm² and having a clearance of 0.4 cm between the electrodes. One of the electrodes is imparted with 1 kg weight, and a voltage E (V/cm) is applied across the electrodes, and the resistivity of the magnetic particles is determined from the current through the circuit.

Figure 12:
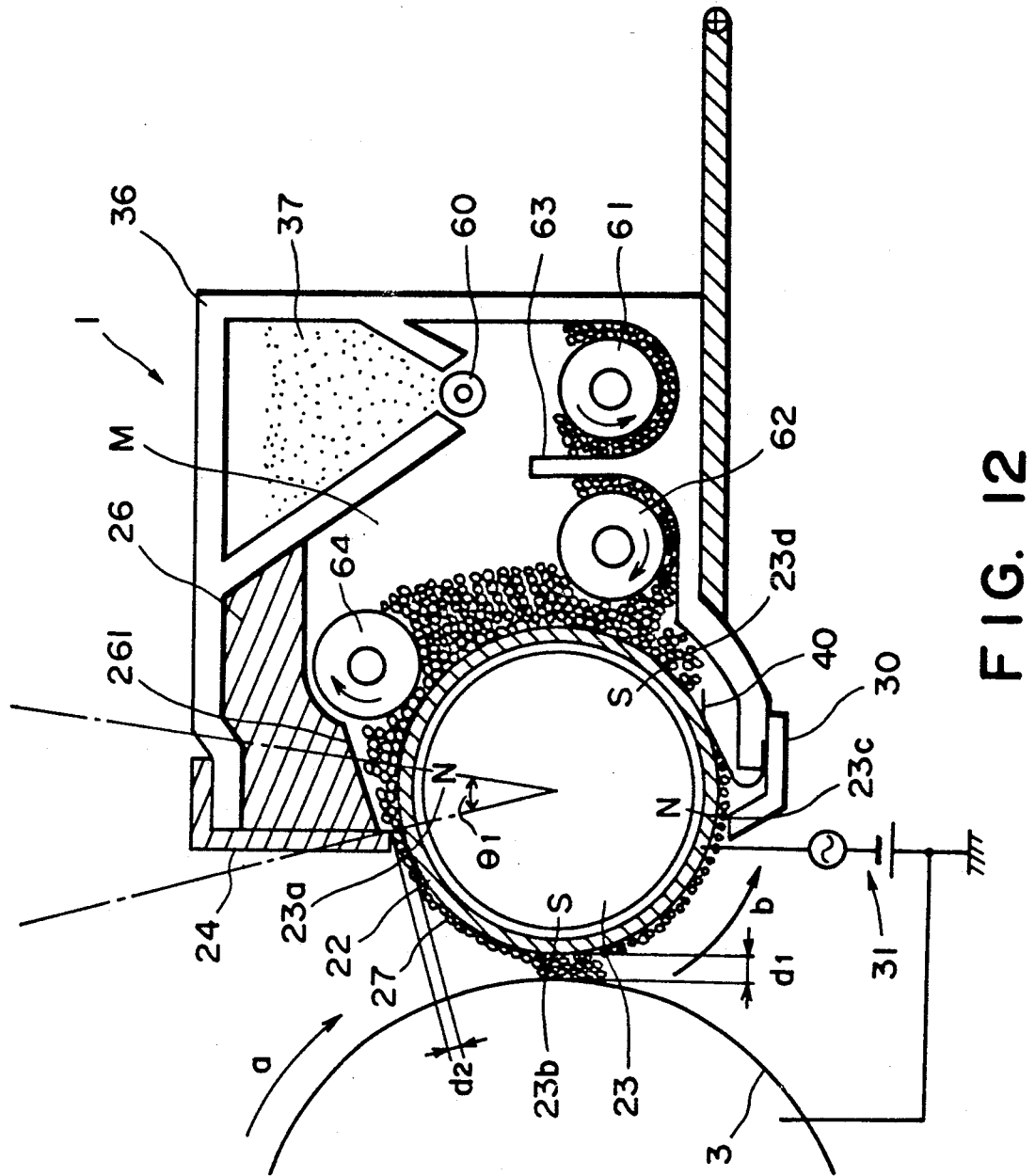
FIG. 12 is a sectional view of a developing apparatus according to an embodiment of the present invention.

FIG. 12 is a cross-sectional view of one of the developing devices of the rotary type developing apparatus 1 used with the laser beam printer shown in FIG. 1. Each of the developing devices has the similar structure. The developing device in FIG. 12 is disposed at the developing position faced to the photosensitive drum 3.

The developing device has a developing sleeve opposed close to the photosensitive drum at the developing zone where the developer is supplied to the photosensitive drum. The developing sleeve 22 is made of non-magnetic material such as aluminum, stainless steel (SUS 316). The developing sleeve 22 is disposed in an elongated opening of a developer container 36 at the bottom left part of its wall. Substantially a half circumference thereof is within the container 36. The container 36 contains a two component developer containing non-magnetic toner particles and magnetic carrier particles. The other half circumference thereof is exposed outside of the container. It is rotatable in the direction indicated by an arrow b. The developing sleeve 22 carries the two component developer supplied thereonto in the container 36 to the developing zone, where the developer is supplied to the photosensitive drum 3. A magnetic brush of the developer is formed on the sleeve 22 in the developing zone and is lightly contacted to the drum 3.

In the developing sleeve 22, a stationary permanent magnet 23 is disposed. The magnet 23 has a magnetic pole 23a (N pole), a magnetic pole 23b (S pole), a magnetic pole 23c (N pole) and a magnetic pole 23d (S pole), i.e., four magnetic poles. The magnet 23 may be in the form of an electromagnet rather than the permanent magnet.

At the top edge of the opening of the developer container in which the developing sleeve 22 is disposed, a non-magnetic blade 24 is disposed which is fixed at a wall of the container at its base portion, and the other end thereof is disposed to the sleeve 22. The sleeve extends along the length of the opening and functions to regulate the thickness of the layer of the developer to be conveyed to the developing zone. The blade 24 is a stainless steel plate (SUS 316) having an "L" cross-section. Adjacent the non-magnetic blade 24, there is disposed a magnetic particle confining member 26 is provided which has a developer guiding surface 261. The non-magnetic blade 24, the magnetic particle combining member 26 and the like constitute the regulating portion.

The developer contains the magnetic carrier particles 27 and the non-magnetic toner particles 37. In order to seal the toner particles stagnating at the bottom portion of the developer container 36, a sealing member 40 is provided. The sealing member 40 has an elasticity and therefore is vent along with the rotational direction of the sleeve 22 to elastically press to the surface of the sleeve 22. The sealing member 40 has an end portion at the downstream portion of the contact area with the sleeve with respect to the rotational direction of the sleeve so as to permit the developer to entire the container.

In the container, there is provided a scattering preventing electrode plate 30 is provided to apply a voltage to the suspending toner produced by the developing action a voltage having the same polarity as the toner particles, thus depositing them to the photosensitive drum 3 to prevent the scattering of the toner. Also, in the container, there is disposed a toner supplying roller 60 operated in accordance with an output of a toner content detecting sensor (not shown). As for this sensor, it may be of a developer volume detecting type, piezoelectric element type, inductance change detecting type, an antenna type using an alternating bias voltage, an optical density detecting type or the like. The non-magnetic toner particles 37 are supplied by the rotation of the roller 60. The fresh developer with the supplied toner 37 is conveyed by a screw 61, while they are mixed and stirred. Therefore, the triboelectric charge is applied to the supplied toner during the conveyance. A partition plate 63 is partly cut away adjacent longitudinal opposite ends of the developing device, where the fresh developer conveyed by the screw 61 is transferred to a screw 62. The S pole 23d is a conveying magnetic pole to receive the developer after being subjected to the developing operation and to convey the developer to the regulating portion in the container. Adjacent the S pole 23d, the screw 62 disposed close to the sleeve functions to exchange the developer collected after the developing operation with the fresh developer.

The conveying screw 64 is to uniformize the quantity of the developer along the length of the developing sleeve 22. The developer conveyed on the developing sleeve by the rotation of the sleeve is conveyed in the direction of the length of the sleeve by the screw 64. By this, a part of the developer layer having a projected portion on the sleeve is pushed back, that is, is moved in the direction opposite to the conveying direction of the developer on the sleeve, through a space M of FIG. 12. The screw 64 functions to convey the developer in the direction opposite to the direction by the screw 62.

The structure of the developing device is usable when the magnetic particles and weakly magnetic or non-magnetic toner particles are mixed in the developer container.

The edge of the non-magnetic blade 24 and the developing sleeve 22 are spaced by a clearance $d_2$ of 50–900 microns, preferably 150–800 microns. If the clearance is smaller than 50 microns, the magnetic particles are easily clogged in the clearance with the result of non-uniform developer layer formation and with the result of insufficient developer applied on the sleeve, which leads to a low density and non-uniform image provided. In order to prevent in the clogging of the clearance by the agglomerated toner contained in the developer and other foreign particles, the clearance $d_2$ is preferably not less than 400 microns. If it is larger than 900 microns, the amount of the developer applied on the developing sleeve 22 is increased, and therefore, the desired thickness of the developer layer is not obtained. In this case, the quantity of the magnetic particles deposited onto the photosensitive drum is increased, and the developer regulation by the circulation of the developer and the action of the developer containing member 26 become not enough with the result of insufficient triboelectric charge of the toner which leads to production of the foggy background.

The angle $\theta_1$ in the Figure is −5–35 degrees, preferably 0–25 degrees. If $\theta_1 < -5$ degrees, the developer thin layer provided by the magnetic force, image force and/or agglomeration force applied to the developer is sparse and non-uniform. If $\theta_1 > 35$ degrees, the amount of the developer layer applied increases when the non-magnetic blade is used, so that it becomes difficult to provide the desired amount of developer.

To the sleeve 22, a vibratory bias voltage which is a DC biased AC voltage is supplied from the source 31, by which between the drum 3 and the sleeve 22 in the developing zone, a vibratory electric field is formed in which the direction of the field alternately changes in short period. By the vibratory electric field, the toner makes vibratory motions, by which the toner becomes more easily releasable from the surface of the carrier particles and the surface of the sleeve, so that the electrostatic latent image can be developed with a high development efficiency. Here, the light portion potential and the dark portion potential of the latent image is between the top and bottom peaks of the vibratory bias voltage. When a DC voltage is to be superposed, the voltage thereof is preferably at a level between the light portion potential and the dark portion potential.

In the printer in the embodiments, the reverse development is effected, and therefore, the toner is charged to the same polarity as the dark portion potential of the latent image.

In the developing device, the used toner has the particle size distribution and the particle size satisfying the above-described conditions. For example, the toner having the volume average particle size of 6 microns is used. The clearance $d_2$ between the non-magnetic blade 24 and the developing sleeve 22 surface was 600 microns. The clearance between the developing sleeve 22 surface and the photosensitive drum 3 was 450 microns.

The photosensitive drum 3 was made of a laminated type organic photoconductor (OCP). The light portion potential of the latent image where the toner particles were to be deposited was −150 V, and the dark portion potential which constituted the background was −600 V. The bias voltage source provided a rectangular wave AC voltage having a frequency of 1700 Hz and the peak-to-peak voltage of 1500 V biased with a DC voltage of −300 V.

On the photosensitive drum, a magenta, a cyan, a yellow and a black images were formed in this order. The semiconductor laser produced a laser beam having a spot size on the drum of 42 microns in the main scan direction and 70 microns in the sub-scan direction. The on-period of the laser beam was controlled in accordance with the driving pulse width control described in the foregoing in accordance with the color separated original image information. The image was written at the density of 200 lines/inch and with 256 tone gradations to form latent images. They were sequentially developed and transferred, and finally fixed. By this, a full-color image was produced wherein the light image density portion were faithfully reproduced, and the image quality was high without the roughness.

On the contrary, when the laser beam spot diameter was 70 microns in the direction of the main scan, and the toner particles having the volume average particle size of 12 microns were used, and the image was produced under the same conditions, the reproducibility of the image in the light image density portion was poor, and the image was rough, as compared with the image formed with the toner having the average particle size of 6 microns.

FIG. 13 shows another image forming apparatus to which the present invention is applicable.

In this embodiment, the image forming apparatus is in the form of a full-color laser beam printer, but as contrasted to the foregoing embodiment, the apparatus is provided with the image bearing members for the respective colors. More particularly, it comprises an electrophotographic photosensitive drum 3Y for yellow image formation, a drum 3M for magenta image formation, a drum 3C for cyan image formation and a drum 3BK for black image formation. Around the respective drums, the laser beam scanners 80Y, 80M, 80C and 80BK are disposed, respectively. Also, around the respective drum, there are disposed a developing devices 1Y, 1M, 1C and 1BK; image transfer dischargers 10Y, 10M, 10C and 10BK; and cleaning devices 12Y, 12M, 12C and 12BK.

The transfer material is sequentially conveyed along the sheet guide 5a, by the feeding roller 6 along the sheet guide 5b to the attraction charger 81 by which it is corona-charged to be assuredly attracted on the conveying belt 9a.

Thereafter, the images formed on the respective photosensitive drums are sequentially transferred superposedly onto a transfer material by the chargers 10Y, 10M, 10C and 10BK, respectively. It is discharged by a discharger 82 and is separated from the conveying belt 9a, and the image is fixed by the fixing device 17 into a full-color image. Also, when the above-described transfer system is used, the laser beam spot size in the scanning direction is not more than 42 microns under the condition that the recording density is 400 dpi, and the developing device shown in FIG. 12 is used. The toner has the volume average particle size of less than 12 microns, preferably not more than 9 microns, and further preferably not more than 8 microns and not less than 4 microns is used. By doing so, the good tone gradation and with less toner scattering were obtained even at the low image density portions, so that a fine full-color image can be produced.

The detailed examples will be described, concentrating on the toner.

EXAMPLE 1

| | |
|---|---|
| Polyester resin obtained by condensation of propoxidized bisphenol and fumaric acid (weight-average molecular weight (Mw) = 15,000, number-average molecular weight m(Mn) = 3,300) | 100 wt. parts |
| Rhodamine pigment | 5 wt. parts |
| Negative charge control agent (metal complex of di-alkyl-substituted salicylic acid) | 4 wt. parts |

A mixture containing the above ingredients in the prescribed amounts was melt-kneaded. After cooling, the kneaded product was pulverized and the pulverized product was classified by means of a fixed-wall type wind-force classifier and further classified by means of a multi-division classifier utilizing a Coanda effect to obtain negatively chargeable magenta toner having a volume-average particle size of 6 microns.

The thus obtained magenta toner had a sharp particle size distribution such that it contained 95% by volume of particles having a particle size of above 3 microns and below 9 microns, and substantially 100% by volume of particles having a particle size of above 0 microns and below 12 microns.

0.4 wt. part of negatively chargeable hydrophobic colloidal silica was mixed with 100 wt. parts of the above-mentioned magenta toner to prepare a magenta toner containing externally added silica (i.e., external addition product). Then, 6 wt. parts of the magenta toner (external addition product) was mixed with 94 wt. parts of ferrite magnetic particles coated with a styrene-acrylic acid ester copolymer (weight-average particle size: 50 microns, electric resistivity: $10^{10}$ ohm/cm) to prepare a two-component developer for forming a magenta toner image.

By using cyan, yellow and black colorants shown in the following Table 2, a two-component developer for forming a cyan toner image, a two-component developer for forming a yellow toner image; and a two-component developer for forming a black toner image were respectively prepared in the same manner as described above.

TABLE 2

| | Colorant | Volume average particle size M (μm) | Volume of toner having particle size > (1/2)M and < (3/2)M | Volume of toner having particle size > 0 and < 2M |
|---|---|---|---|---|
| Cyan toner | Phthalocyanine pigment | 6 | 95 | 100 |
| Yellow toner | Pigment yellow pigment | 6 | 95 | 100 |
| Black toner | Mixture of pigment yellow pigment, pigment red pigment and pigment blue pigment | 6 | 95 | 100 |

Each of the two component developers is poured into a polyethylene resin container having a volume of 100 ml, and it is shaked by hands approximately 30 times, and then, triboelectric charge of the toner is measured. The measurements for the respective color toner particles were approximately −30 micro-coulomb/g.

The two component developer was supplied to the color image forming apparatus shown in FIG. 1. In the developing device of this embodiment, the clearance $d_2$ between the non-magnetic blade 24 end and the developing sleeve 22 surface was 600 microns, and the clearance $d_1$ between the developing sleeve 22 surface and the photosensitive drum 3 surface was 450 microns.

The photosensitive drum 3 was a laminated type organic photoconductor (OPC), and the light portion potential was −150 V, while the dark portion potential was −600 V in the latent image.

The bias voltage source provided a rectangular wave AC voltage having a frequency of 1700 Hz and a peak-to-peak voltage of 1500 V biased with −300 V DC voltage.

On the other hand, the semiconductor laser source provided a laser beam having a spot diameter ($1/e^2$ diameter) of 42 microns in the main scan direction, and the $1/e^2$ diameter of 70 microns in the sub-scan direction. The above-described driving pulse width control was effected to control the emitting period. The image was written at the density of 200 lines/inch and with 256 tone gradation. The reverse development and the electrostatic image transfer were repeated sequentially, and finally, the images was fixed by a heating and fixing roller to produce a full-color image. Then, the image was high quality and sufficiently fine without roughness, wherein the light image density portion (high light portion) was faithfully reproduced.

When the resultant full-color image was observed, the dots having the size of 50 microns were faithfully reproduced, corresponding to the latent images.

EXAMPLES 2-4

Similarly to the Example 1, the toners having the volume average particle size of 5 microns, 6.8 microns and 8 microns were prepared, as shown in Table 3 below. The full-color images was produced in the similarly good.

TABLE 3

| | Volume average particle size of toner | Vol. % of toner particles having a size > (1/2)M and < (3/2)M | Vol. % of toner particles having a size > 0 and < 2M |
|---|---|---|---|
| Example 2 | 5 | 93 | 100 |
| Example 3 | 6.8 | 95 | 100 |
| Example 4 | 8 | 96 | 100 |

COMPARISON EXAMPLE

Similarly to the Example 1, the respective color toner particles having the volume average particle size of 12 microns were prepared, as shown in Table 4.

TABLE 4

| | Volume average particle size of toner | Vol. % of toner particles having a size > (1/2)M and < (3/2)M | Vol. % of toner particles having a size > 0 and < 2M |
|---|---|---|---|
| Magenta toner | 12 | 85 | 97 |
| Cyan toner | 12 | 85 | 97 |
| Yellow toner | 12 | 85 | 97 |
| Black toner | 12 | 85 | 97 |

Similarly to the Example 1, the two component developer was prepared, and the color image was formed. In the resultant image, as compared with the image by the Example 1, the roughness of the image was remarkable, although the reproducibility was good even at the low image density portion.

The two component developer is poured into a polyethylene resin container having a volume of 100 ml, and it was shaked by hands approximately 30 times, and the triboelectric charge of the toner was measured. It was −16−−18 micro-coulomb/g for each color toner, it was lower as compared with the case of Example 1.

When the provided full-color image was observed, the minimum dot size in which the latent image was faithfully reproduced was approximately 90 microns. For the smaller dots, the scattering was remarkable.

EXAMPLE 5

Similarly to the Example 1, each color toner having the volume average particle size of 9 microns was prepared, as shown in Table 5. Similarly to the Example 1, the two-component developer was prepared.

The color image was formed in the manner similar to the Example 1. The resultant image was fine and of high quality with less roughness and with faithful reproduction of the low image density portions (high light portion), although the image was slightly poorer than the image by the Example 1.

When the full-color image was observed, the dots having the size of approximately 60 microns were faithfully reproduced, and the dots having the size of approximately 50 microns were relatively faithfully reproduced with respect to the latent image.

TABLE 5

|  | Volume average particle size of toner | Vol. % of toner particles having a size > (1/2)M and < (3/2)M | Vol. % of toner particles having a size > 0 and < 2M |
|---|---|---|---|
| Magenta toner | 9 | 96 | 100 |
| Cyan toner | 9 | 96 | 100 |
| Yellow toner | 9 | 96 | 100 |
| Black toner | 9 | 96 | 100 |

In the foregoing embodiments, the two component developer having ferrite carrier particles, and a vibratory bias voltage is applied to the sleeve; and the bias voltage is in the form of an AC bias voltage which is DC-biased. However, the present invention is applicable to the case wherein the two component developer contains usual ion particles as the carrier, and a DC bias voltage is applied to the sleeve.

Figure 14:
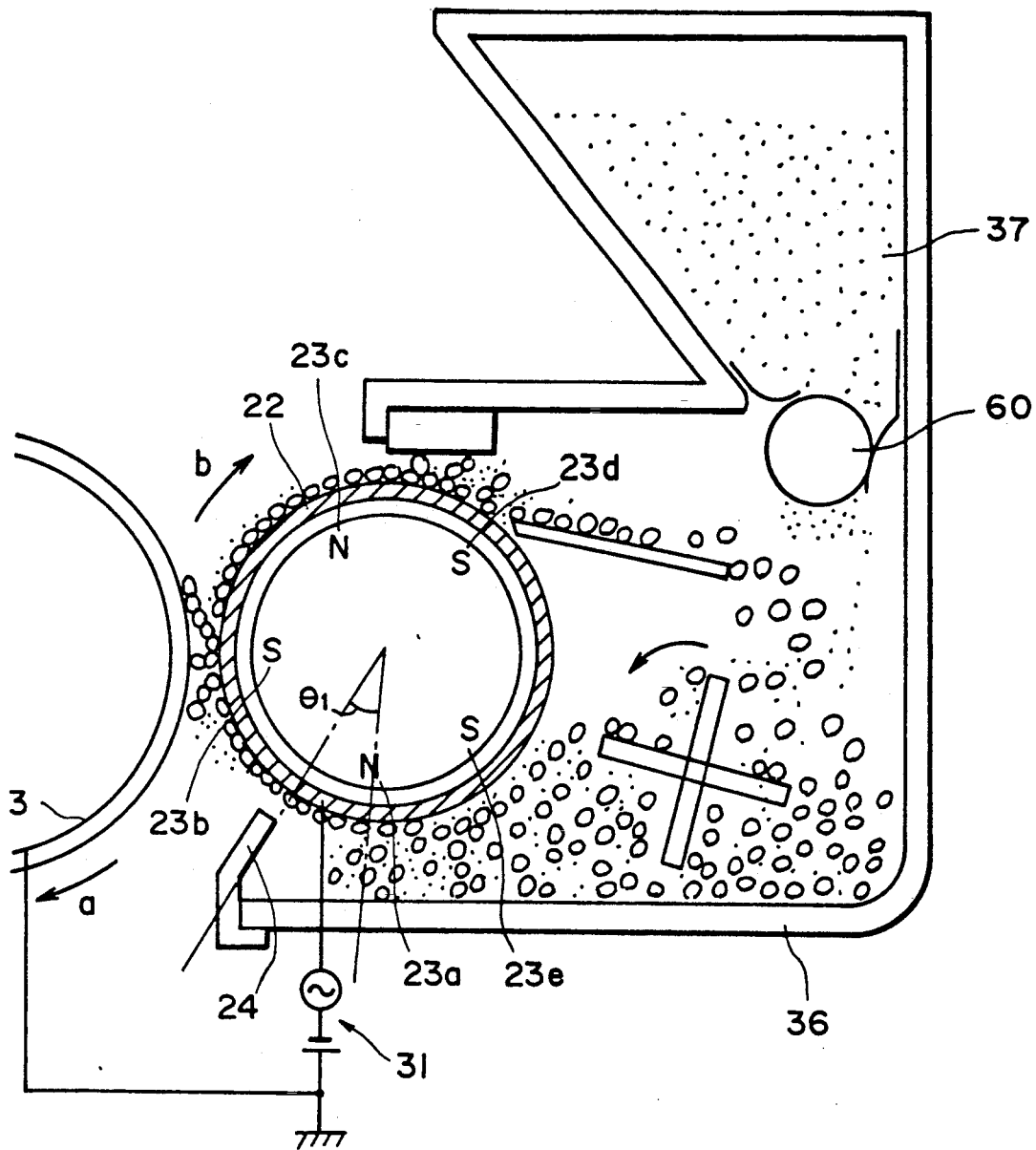
FIG. 14 is a cross-sectional view of a developing apparatus according to a further embodiment of the present invention.

When the developing device having the structure shown in FIG. 14 was used, and when the developing sleeve was rotated in the opposite direction, that is, the peripheral surface of the developing sleeve was moved in the opposite direction from the photosensitive drum in the developing zone. It was confirmed that the similar advantageous effects were obtained when the average particle size was not more than 8 microns.

The present invention is applicable not only to the so-called contact type developing device wherein the developer is contacted to the photosensitive member in the developing zone but also to the so-called non-contact type developing apparatus wherein the thickness of the developer layer carried on the sleeve is smaller than the clearance between the photosensitive member and the sleeve in the developing zone.

The present invention is also applicable to the developing device using a one component developer not containing the carrier particles.

The use of the present invention is not limited to the color printer described above, but is applicable to a printer (monochromatic printer) using the electrophotographic process wherein the tone reproduction is important.

While the invention has been described with reference to the structures disclosed herein, it is not confined to the details set forth and this application is intended to cover such modifications or changes as may come within the purposes of the improvements or the scope of the following claims.

What is claimed is:

1. An image forming apparatus, comprising:
an electrophotographic photosensitive member;
a light source for producing a beam;
control means for controlling an on-period of the beam per picture element of said light source in accordance with an image signal to be recorded;
an optical system for scanning said photosensitive member with the beam from said light source in a main scan direction, wherein the beam provides a spot having a size, measured in the main scan direction, which is not more than 0.7 times a size of a unit picture element and which is not more than 42 microns;
developing means for developing the electrostatic latent image formed on said photosensitive member by said optical system scanning it, said developing means supplies a developer containing toner particles;
wherein not less than 90% by volume of the toner particles satisfy:

$(\frac{1}{2})M < r < (3/2)M$, and not less than 99% by volume of the toner particles satisfy:

$0 < r < 2M$, where M is a volume average particle size of the toner, and r is a particle size of the toner particle; and
image transfer means for transferring the developed image from said photosensitive member to a transfer material.

2. An apparatus according to claim 1, wherein the volume average particle size M of the toner is not more than 12 microns.

3. An apparatus according to claim 2, wherein the volume average particle size M of the toner is not more than 9 microns.

4. An apparatus according to claim 3, wherein the volume average particle size M of the toner is not more than 8 microns.

5. An apparatus according to any one of claims 1–4, wherein said developing means reverse-develops the electrostatic latent image.

6. An apparatus according to claim 5, wherein said light source comprises a semiconductor laser device, and said control means controls a laser driving pulse width in accordance with the image signal.

7. An apparatus according to claim 6, wherein said developing means further comprises a developer container for containing the developer comprising the toner particles and carrier particles, and a developer carrying member for carrying the developer from said developer container to a developing zone where said developer carrying member is faced to said photosensitive member.

8. An apparatus according to claim 9, wherein said developing means includes a voltage source for applying a vibratory bias voltage to said developer carrying member.

9. An apparatus according to claim 8, wherein the spot has a size, measured in a sub-scan direction, which is not less than 1.1 times the unit picture element size.

10. An apparatus according to claim 9, further comprising spot size control means for detecting the spot size and for controlling the spot size.

11. An image forming apparatus, comprising:
an electrophotographic photosensitive member;
a light source for producing a beam;
control means for controlling an on-period of the beam per picture element of said light source in accordance with an image signal to be recorded;
an optical system for scanning said photosensitive member with the beam from said light source on said photosensitive member, wherein the beam provides on said photosensitive member a spot having a size, measured in a main scan direction, which is not more than 0.7 times a size of a unit picture element and which is not more than 42 microns;

developing means for developing the electrostatic latent image formed on said photosensitive member by said optical system scanning said photosensitive member, wherein said developing means supplies a developer to said photosensitive member, the developer containing toner particles having a volume average particle size M of not more than 12 microns;

image transfer means for transferring a developed image formed on said photosensitive member onto a transfer material; and fixing means for fixing the developed image transferred onto the transfer material, wherein said developing means reverse-develops the electrostatic latent image, wherein said light source includes a semiconductor laser device, and said control means controls a laser driving pulse width in accordance with the image signal, wherein the toner has such a particle size distribution that not less than 90% by volume of the toner particles satisfy:

$(\frac{1}{2})M < r < (3/2)M$, and that not less than 99% by volume of the toner particles satisfy:

$0 < r < 2M$, where r is a particle size of the toner particle.

12. An image forming apparatus, comprising:

an electrophotographic photosensitive member;

latent image forming means for forming electrostatic latent images corresponding to plural colors on said photosensitive member, wherein said latent image forming means includes a semiconductor laser means, control means for controlling a driving pulse width of the semiconductor laser beam in accordance with an image signal to be recorded and an optical system for scanning said photosensitive member with a beam emitted from said semiconductor laser beam in a main scan direction;

wherein the beams provide a spot on said photosensitive member having a size, measured in the main scan direction, which is not more than 0.7 times a size of a unit picture element of said image forming apparatus and which is not more than 42 microns;

developing means having a plurality of developing devices for supplying different color developers to said photosensitive member, said developing devices each reverse-developing the electrostatic latent images with corresponding color developer;

image transfer means for transferring the developed images onto a transfer material;

fixing means for fixing the developed images overlaid on the transfer material, wherein said developing means supplies to said photosensitive member the developer containing the toner having such a particle size distribution that not less than 90% by volume of the toner particles satisfy:

$(\frac{1}{2})M < r < (3/2)M$, and not less than 99% by volume of the toner particles satisfy:

$0 < r < 2M$, where M is a volume average particle size of the toner, and r is a particle size of the toner particle.

13. An apparatus according to claim 12, wherein the volume average particle size M of the toner is not more than 12 microns.

14. An apparatus according to claim 13, wherein the volume average particle size M of the toner is not more than 9 microns.

15. An apparatus according to claim 14, wherein the volume average particle size M of the toner is not more than 8 microns.

16. An apparatus according to any one of claims 12-15, wherein each of the developing devices comprising a developer container for containing the developer comprising the toner particles and carrier particles, and a developer carrying member for carrying the developer from said developer container to a developing zone.

17. An apparatus according to claim 16, wherein a vibratory bias voltage is added to said developer carrying member.

18. An apparatus according to any one of claims 12-15, wherein the spot has a size, measured in a sub-scan direction, which is not less than 1.1 times the unit picture element size.

19. An apparatus according to any one of claims 12-15, further comprising spot size control means for detecting the spot size and for controlling the spot size.

* * * * *

UNITED STATES PATENT AND TRADEMARK OFFICE
CERTIFICATE OF CORRECTION

PATENT NO. : 5,313,233  
DATED : May 17, 1994  
INVENTOR(S) : NAGASE, ET AL.

Page 1 of 4

It is certified that error appears in the above-indentified patent and that said Letters Patent is hereby corrected as shown below: On drawing sheet

SHEET 8

Fig. 11, "RPRODUCED" should read --REPRODUCED--.

COLUMN 1

Line 26, "wherein" should read --is effected--

COLUMN 3

Line 31, "sectional" should read --cross-sectional--.

COLUMN 6

Line 14, "and" should read --to--.
Line 16, "clear" should read --clears--.

COLUMN 7

Line 7, "of" should be deleted.
Line 45, "is a" should read --are--.

COLUMN 9

Line 54, "characteristics" should read --characteristic--.
Line 59, "has" should read --as--.

COLUMN 11

Line 24, "in" should read --is in--.

UNITED STATES PATENT AND TRADEMARK OFFICE
CERTIFICATE OF CORRECTION

PATENT NO. 5,313,233

DATED : May 17, 1994

INVENTOR(S): NAGASE, ET AL.

It is certified that error appears in the above-indentified patent and that said Letters Patent is hereby corrected as shown below:

COLUMN 12

Line 29, "blurness" should read --blurriness--.
    Line 50, "Coalter" should read --Coulter--; and
"(Coalter" should read --(Coulter--.

COLUMN 13

Line 18, "volumeaverage" should read --volume-average--.

COLUMN 14

Line 29, "contained" should read --containing--.

COLUMN 15

Line 49, "is pro-" should be deleted.
    Line 50, "vided" should be deleted.
    Line 59, "vent" should read --bent--.
    Line 64, "entire" should read --enter--.
    Line 67, "is provided " should be deleted.

COLUMN 16

Line 1, "action" should read "action,--.

COLUMN 17

Line 41, "images were" should read --image was--.
    Line 53, "wave" should read --was--.

UNITED STATES PATENT AND TRADEMARK OFFICE
CERTIFICATE OF CORRECTION

PATENT NO. : 5,313,233
DATED : May 17, 1994
INVENTOR(S) : NAGASE, ET AL.

It is certified that error appears in the above-indentified patent and that said Letters Patent is hereby corrected as shown below:

COLUMN 18

Line 32, "microns is used." should read --microns.--
Line 33, "and" should be deleted.

COLUMN 19

Line 28, "shaked by hands" should read --shaken by hand--.
Line 56, "was" should read --were--.

COLUMN 20

Line 1, "was" should read --were--; and "simi-" should read --similar manner as in the Example 1. The results were semi- --.
Line 49, "shaked by hands" should read --shaken by hand--.
Line 51, "it" should read --and it--.

UNITED STATES PATENT AND TRADEMARK OFFICE
CERTIFICATE OF CORRECTION

PATENT NO. : 5,313,233
DATED : May 17, 1994
INVENTOR(S) : NAGASE, ET AL.

It is certified that error appears in the above-indentified patent and that said Letters Patent is hereby corrected as shown below:

COLUMN 22

Line 48, "claim 9," should read --claim 7,--.
    Line 55, "claim 9," should read --claim 6,--.

Signed and Sealed this

Twenty-ninth Day of November, 1994

Attest:

BRUCE LEHMAN

*Attesting Officer*    *Commissioner of Patents and Trademarks*